US012764737B2

(12) United States Patent
Wu et al.

(10) Patent No.: US 12,764,737 B2
(45) Date of Patent: Oct. 13, 2026

(54) METHOD FOR TRANSMITTING AND RECEIVING UPLINK CONTROL INFORMATION, TERMINAL AND BASE STATION

(71) Applicant: Samsung Electronics Co., Ltd., Suwon-si (KR)

(72) Inventors: Min Wu, Beijing (CN); Feifei Sun, Beijing (CN); Qi Xiong, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 421 days.

(21) Appl. No.: 18/002,551

(22) PCT Filed: Jun. 17, 2021

(86) PCT No.: PCT/KR2021/007621
§ 371 (c)(1),
(2) Date: Dec. 20, 2022

(87) PCT Pub. No.: WO2021/261842
PCT Pub. Date: Dec. 30, 2021

(65) Prior Publication Data

US 2023/0239869 A1 Jul. 27, 2023

(30) Foreign Application Priority Data

Jun. 24, 2020 (CN) ......................... 202010591634.4

(51) Int. Cl.
*H04W 72/1268* (2023.01)
*H04B 7/06* (2006.01)
(Continued)

(52) U.S. Cl.
CPC ...... *H04W 72/1268* (2013.01); *H04B 7/0632* (2013.01); *H04B 7/0636* (2013.01);
(Continued)

(58) Field of Classification Search
CPC .............. H04W 72/1268; H04W 72/21; H04B 7/0632; H04B 7/0636; H04L 1/1822; H04L 1/1854; H04L 1/0003; H04L 1/1812
See application file for complete search history.

(56) References Cited

U.S. PATENT DOCUMENTS

| | | | |
|---|---|---|---|
| 2010/0281322 A1 | 11/2010 | Park et al. | |
| 2011/0299484 A1 | 12/2011 | Nam et al. | |

(Continued)

FOREIGN PATENT DOCUMENTS

WO WO-2021018221 A1 * 2/2021 .......... H04L 1/1896

OTHER PUBLICATIONS

Supplementary European Search Report dated Sep. 19, 2023, in connection with European Patent Application No. 21829029.4, 8 pages.

(Continued)

*Primary Examiner* — Kevin T Bates
*Assistant Examiner* — Jaeyoung Kwak

(57) ABSTRACT

The present disclosure provides a method for transmitting uplink control information, a method for receiving uplink control information, a method for configuring a downlink HARQ feedback function, a terminal and a base station. The method for transmitting uplink control information comprises: transmitting uplink control information to a base station, wherein the uplink control information comprises at least one of decoding statistical information for downlink transmission, suggestion information for downlink scheduling, or channel quality related information.

19 Claims, 12 Drawing Sheets

(51) Int. Cl.

| | |
|---|---|
| ***H04L 1/1822*** | (2023.01) |
| ***H04L 1/1829*** | (2023.01) |
| ***H04W 72/21*** | (2023.01) |
| *H04L 1/00* | (2006.01) |
| *H04L 1/1812* | (2023.01) |

(52) U.S. Cl.

CPC .......... *H04L 1/1822* (2013.01); *H04L 1/1854* (2013.01); *H04W 72/21* (2023.01); *H04L 1/0003* (2013.01); *H04L 1/1812* (2013.01)

(56) References Cited

U.S. PATENT DOCUMENTS

| | | | | |
|---|---|---|---|---|
| 2018/0167934 | A1 | 6/2018 | Seo et al. | |
| 2018/0310298 | A1 | 10/2018 | Li et al. | |
| 2019/0007182 | A1 | 1/2019 | Li et al. | |
| 2019/0229788 | A1 | 7/2019 | Zhang et al. | |
| 2020/0022137 | A1 | 1/2020 | Xiao et al. | |
| 2020/0396023 | A1* | 12/2020 | Wang | H04L 1/1854 |
| 2020/0396760 | A1* | 12/2020 | Yi | H04W 72/23 |
| 2022/0006503 | A1* | 1/2022 | Bae | H04L 5/0098 |
| 2022/0369349 | A1* | 11/2022 | Lee | H04W 72/20 |
| 2022/0386407 | A1* | 12/2022 | Kim | H04L 1/1861 |
| 2023/0163887 | A1* | 5/2023 | Cheng | H04W 72/23 370/329 |

OTHER PUBLICATIONS

International Search Report and Written Opinion of the International Searching Authority dated Sep. 17, 2021, in connection with International Application No. PCT/KR2021/007621, 14 pages.

Office Action issued May 27, 2026, in connection with Korean Patent Application No. 10-2022-7045071, 11 pages.

* cited by examiner

FIG. 18

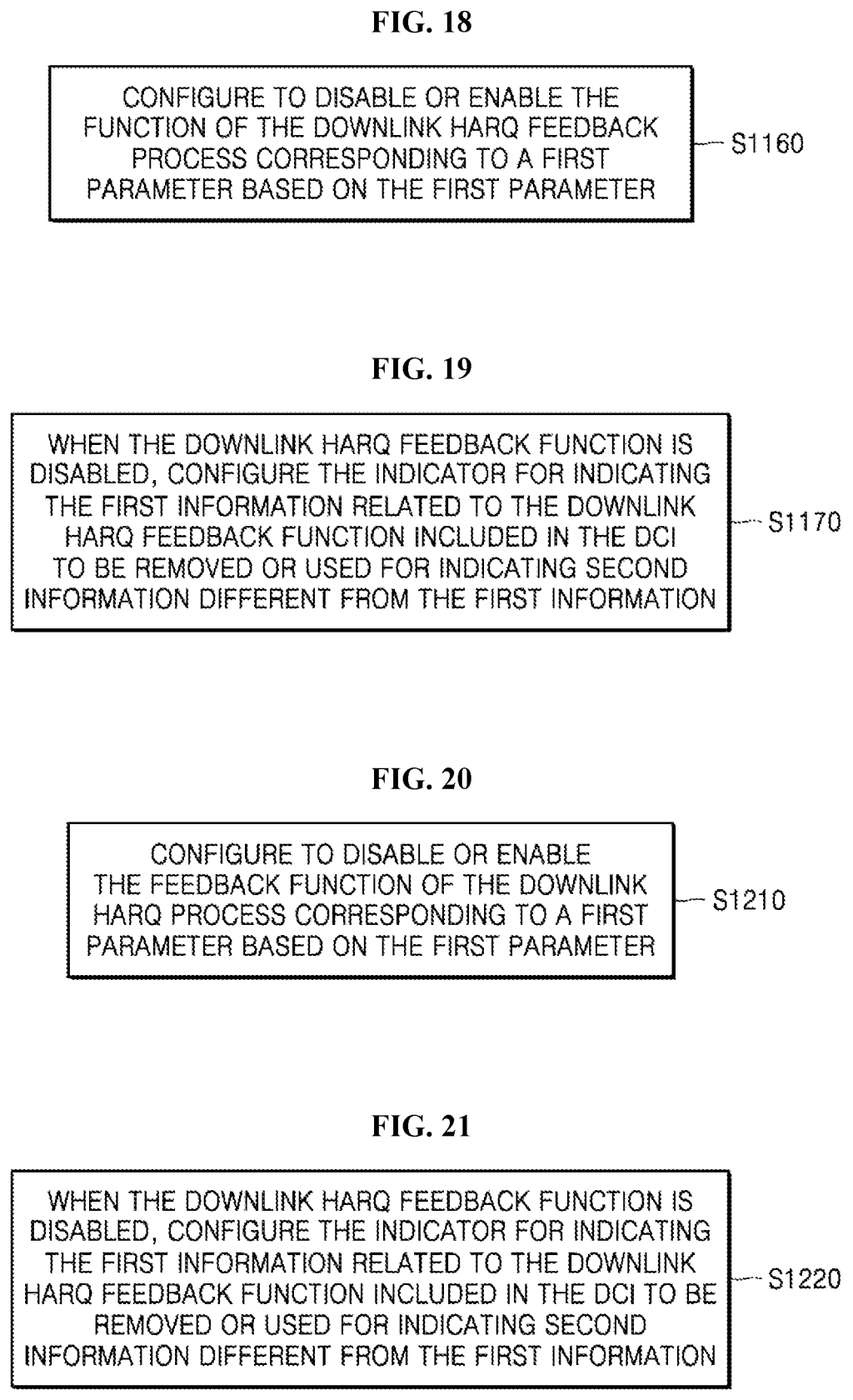

CONFIGURE TO DISABLE OR ENABLE THE FUNCTION OF THE DOWNLINK HARQ FEEDBACK PROCESS CORRESPONDING TO A FIRST PARAMETER BASED ON THE FIRST PARAMETER — S1160

FIG. 19

WHEN THE DOWNLINK HARQ FEEDBACK FUNCTION IS DISABLED, CONFIGURE THE INDICATOR FOR INDICATING THE FIRST INFORMATION RELATED TO THE DOWNLINK HARQ FEEDBACK FUNCTION INCLUDED IN THE DCI TO BE REMOVED OR USED FOR INDICATING SECOND INFORMATION DIFFERENT FROM THE FIRST INFORMATION — S1170

FIG. 20

CONFIGURE TO DISABLE OR ENABLE THE FEEDBACK FUNCTION OF THE DOWNLINK HARQ PROCESS CORRESPONDING TO A FIRST PARAMETER BASED ON THE FIRST PARAMETER — S1210

FIG. 21

WHEN THE DOWNLINK HARQ FEEDBACK FUNCTION IS DISABLED, CONFIGURE THE INDICATOR FOR INDICATING THE FIRST INFORMATION RELATED TO THE DOWNLINK HARQ FEEDBACK FUNCTION INCLUDED IN THE DCI TO BE REMOVED OR USED FOR INDICATING SECOND INFORMATION DIFFERENT FROM THE FIRST INFORMATION — S1220

METHOD FOR TRANSMITTING AND RECEIVING UPLINK CONTROL INFORMATION, TERMINAL AND BASE STATION

CROSS-REFERENCE TO RELATED APPLICATIONS

This application is a 371 National Stage of International Application No. PCT/KR2021/007621, filed Jun. 17, 2021, which claims priority to Chinese Patent Application No. 202010591634.4, filed Jun. 24, 2020, the disclosures of which are herein incorporated by reference in their entirety.

BACKGROUND

1. Field

The present disclosure relates to the technical field of wireless communication, and in particular to methods for transmitting and receiving uplink control information, terminals and base stations.

2. Description of Related Art

To meet the demand due to ever-increasing wireless data traffic after the commercialization of the 4th generation (4G) communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. Implementation of the 5G communication system using ultra-frequency millimeter wave (mmWave) bands, e.g., 60 giga hertz (GHz) bands, is considered to attain higher data transfer rates. To reduce propagation loss of radio waves and increase a transmission range in the ultra-frequency bands, beamforming, massive multiple-input multiple-output (MIMO), Full Dimensional MIMO (FD-MIMO), array antenna, analog beamforming, and large-scale antenna techniques are under discussion. To improve system networks, technologies for advanced small cells, cloud Radio Access Networks (RANs), ultra-dense networks, device to device (D2D) communication, wireless backhaul, moving networks, cooperative communication, Coordinated Multi-Points (CoMP), reception-end interference cancellation and the like are also being developed in the 5G communication system. In addition, in the 5G system, an advanced coding modulation (ACM), e.g., hybrid frequency-shift keying (FSK) and quadrature amplitude modulation (QAM) (FQAM), sliding window superposition coding (SWSC), and an advanced access technology, e.g., filter bank multi carrier (FBMC), non-orthogonal multiple access (NOMA), and sparse code multiple access (SCMA), are being developed.

In the meantime, the Internet is evolving from a human-centered connectivity network where humans generate and consume information into an Internet of Things (IoT) network where distributed entities such as things transmit, receive and process information without human intervention. Internet of Everything (IoE) technologies combined with IoT, such as big data processing technologies through connection with a cloud server, for example, have also emerged. To implement IoT, various technologies, such as a sensing technology, a wired/wireless communication and network infrastructure, a service interfacing technology, and a security technology are required, and recently, even technologies for sensor network, Machine to Machine (M2M), Machine Type Communication (MTC) for connection between things are being studied. Such an IoT environment may provide intelligent Internet Technology (IT) services that generate a new value to human life by collecting and analyzing data generated among connected things. IoT may be applied to a variety of areas, such as smart homes, smart buildings, smart cities, smart cars or connected cars, smart grids, health care, smart home appliances and advanced medical services through convergence and combination between existing Information Technologies (IT) and various industrial applications.

In this regard, various attempts to apply the 5G communication system to the IoT network are being made. For example, technologies regarding a sensor network, M2M, MTC, etc., are implemented by the 5G communication technologies, such as beamforming, MIMO, array antenna schemes, etc. Even application of a cloud Radio Access Network (cloud RAN) as the aforementioned big data processing technology may be viewed as an example of convergence of 5G and IoT technologies.

As described above, various services can be provided according to the development of a wireless communication system, and thus a method for easily providing such services is required.

SUMMARY

*6There is a need for a method for transmitting uplink control information, a method for receiving uplink control information, a method for configuring a downlink HARQ feedback function, a terminal and a base station.

According to an aspect of the present disclosure, there is provided a method for transmitting uplink control information, comprising: transmitting uplink control information to a base station, wherein the uplink control information includes at least one of: decoding statistical information for downlink transmission, suggestion information for downlink scheduling, or channel quality related information.

According to an aspect of the present disclosure, there is provided a method for receiving uplink control information, comprising: receiving uplink control information transmitted by a terminal, wherein the uplink control information comprises at least one of: decoding statistical information for downlink transmission, suggestion information for downlink scheduling, or channel quality related information.

According to an aspect of the present disclosure, there is provided a method for configuring a downlink hybrid automatic repeat request HARQ feedback function, comprising: configuring to disable or enable a feedback function of a HARQ process corresponding to a first parameter based on the first parameter.

According to another aspect of the present disclosure, there is provided a user equipment, comprising: a transceiver configured to transmit and receive signals with the outside; and a processor configured to control the transceiver to perform any one of the above methods performed by the user equipment.

According to another aspect of the present disclosure, there is provided a base station, comprising: a transceiver configured to transmit and receive signals with the outside; and a processor configured to control the transceiver to perform any one of the above methods performed by the base station.

According to another aspect of the present disclosure, there is provided a non-transitory computer-readable recording medium having stored thereon a program, which when executed by a computer, performs any one of the methods described above.

The present disclosure provides a method for transmitting uplink control information, a method for receiving uplink control information, a method for configuring a downlink HARQ feedback function, a terminal and a base station, which assist the downlink scheduling of the base station and are beneficial to improving the problem of reduced downlink transmission efficiency.

BRIEF DESCRIPTION OF THE DRAWINGS

FIG. 18 illustrates a part of flowchart of a method for receiving uplink control information provided by an embodiment of the present disclosure;

FIG. 19 illustrates a part of flowchart of a method for receiving uplink control information provided by an embodiment of the present disclosure;

FIG. 20 illustrates a flowchart of a method for configuring downlink HARQ feedback function provided by an embodiment of the present disclosure;

FIG. 21 illustrates a part of a flowchart of a method for configuring downlink HARQ feedback function provided by an embodiment of the present disclosure;

DETAILED DESCRIPTION

Figure 1:
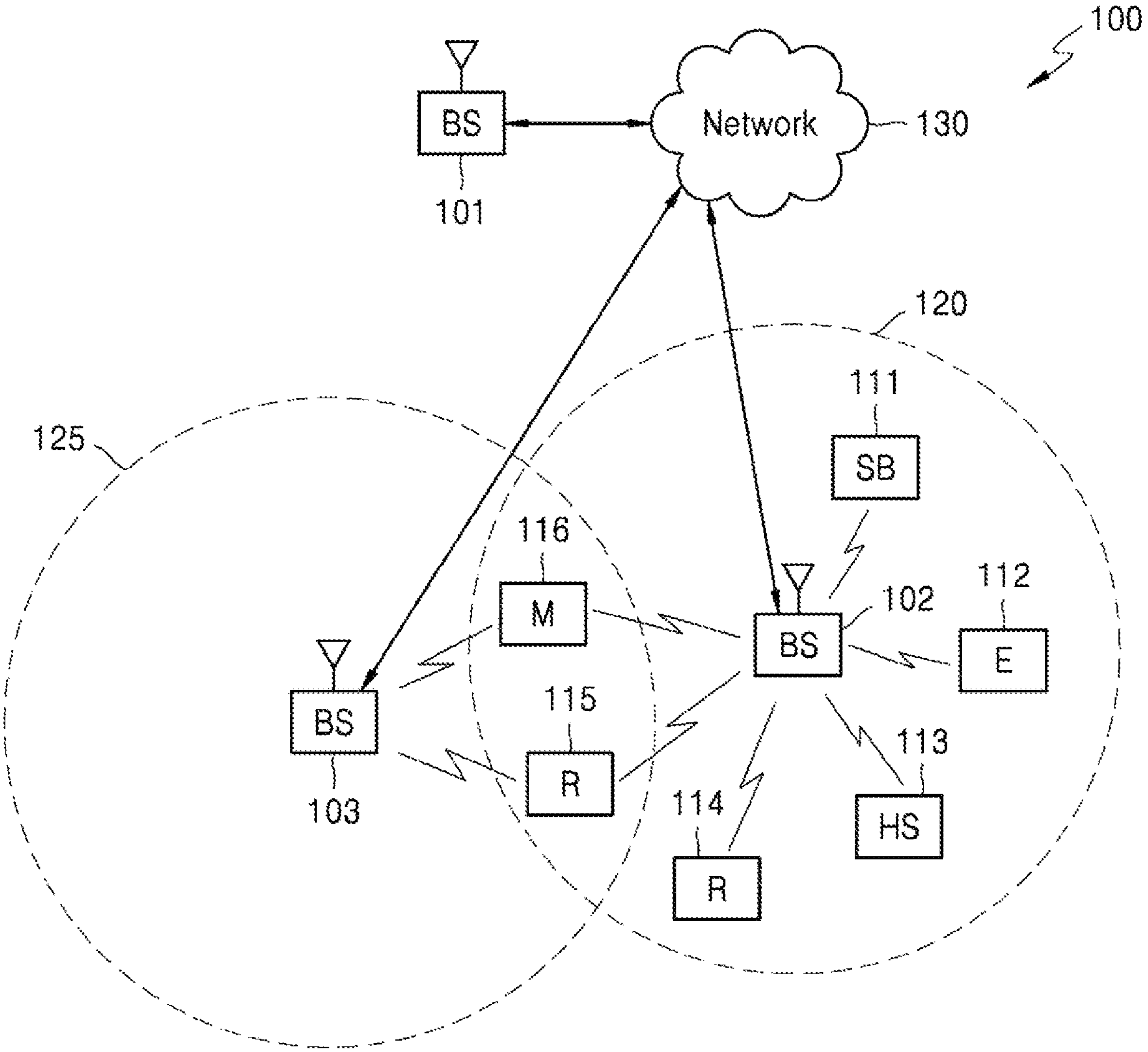
FIG. 1 illustrates an exemplary wireless network according to various embodiments of the present disclosure.

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

Embodiments of the present disclosure can be applied to Non-terrestrial networks (NTN), including but not limited to, for example, NTNs with 5G NR (New Radio) as a radio access technology, NTNs with LTE (Long Term Evolution) as a radio access technology, NTNs with LTE eMTC (LTE enhanced MTO, Internet of Things technology evolved based on LTE) as a radio access technology, and NTNs with LTE NB-IOT (Narrow Band Internet of Things) as a radio access technology, etc. With the wide-area coverage capability of satellites, NTN can enable operators to provide 5G commercial services in areas with poor ground network infrastructure and realize 5G service continuity, especially playing a role in scenarios such as emergency communication, maritime communication, aviation communication and communication along railways, etc.

In addition, embodiments of the present disclosure can also be applied to terrestrial communication networks, including but not limited to, for example, terrestrial communication networks with 5G NR as a radio access technology, terrestrial communication networks with LTE as a radio access technology, terrestrial communication networks with LTE eMTC as a radio access technology, and terrestrial communication networks with LTE NB-IOT as a radio access technology, etc.

Taking FIGS. 1 to 3B as examples in the following to describe a terrestrial communication network to which embodiments of the present disclosure can be applied.

FIG. 1 is an exemplary wireless network 100 according to various embodiments of the present disclosure. The embodiment of the wireless network 100 shown in FIG. 1 is for illustration only. Other embodiments of the wireless network 100 can be used without departing from the scope of this disclosure.

The wireless network 100 includes a gNodeB (gNB) 101, a gNB 102 and a gNB 103. The gNB 101 communicates with the gNB 102 and the gNB 103. The gNB 101 also communicates with at least one Internet protocol (IP) network 130, such as the Internet, a proprietary IP network, or other data networks.

Other well-known terms such as "base station", "BS" or "access point" can be used instead of "gNodeB" or "gNB" depending on network types. For convenience, the terms "gNodeB" and "gNB" are used in this patent document to refer to network infrastructure components that provide a radio access to remote terminals. And, other well-known terms such as "mobile station", "user station", "user terminal", "remote terminal", "wireless terminal" or "user device" can be used instead of "user equipment" or "UE", depending on the network types. For convenience, the terms "user equipment" and "UE" are used in this patent document to refer to remote wireless devices that wirelessly access the gNBs, regardless of the UE being a mobile device (such as a mobile phone or a smart phone) or a stationary device normally considered (such as a desktop computer or a vending machine).

The gNB 102 provides a wireless broadband access to the network 130 for a first plurality of user equipment (UE) within a coverage area 120 of the gNB 102. The first plurality of UE includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides a wireless broadband access to the network 130 for a second plurality of UE within a coverage area 125 of the gNB 103. The second plurality of UE includes the UE 115 and the UE 116. In some embodiments, one or more of the gNBs 101-103 may communicate with each other and with the UE 111-116 using 5G, long Term Evolution (LTE), LTE-A, WiMAX, or other wireless communication techniques.

Dotted lines show the approximate scopes of the coverage areas 120 and 125, which are shown as an approximately circular for the purposes of illustration and explanation only. It should be clearly understood that the coverage areas associated with gNBs, such as the coverage areas 120 and 125, may have other shapes, including irregular shapes, depending on the configuration of the gNBs and variations in a radio environment associated with natural and manmade obstructions.

As will be described in more detail below, one or more of the gNB 101, the gNB 102, and the gNB 103 include 2D antenna arrays as described in embodiments of the present disclosure. In some embodiments, one or more of the gNB 101, the gNB 102, and the gNB 103 support codebook design and structure for systems with 2D antenna arrays.

Although FIG. 1 illustrates an example of a wireless network 100, various changes can be made to FIG. 1. For example, the wireless network could include any number of gNBs and any number of UE in any suitable arrangement. Also, the gNB 101 could communicate directly with any number of UEs and provide those UEs with wireless broadband access to the network 130. Similarly, each gNB 102-103 could communicate directly with the network 130 and provide UE with direct wireless broadband access to the network 130. Further, the gNBs 101, 102, and/or 103 could provide access to other or additional external networks, such as external telephone networks or other types of data networks.

Figure 2A:
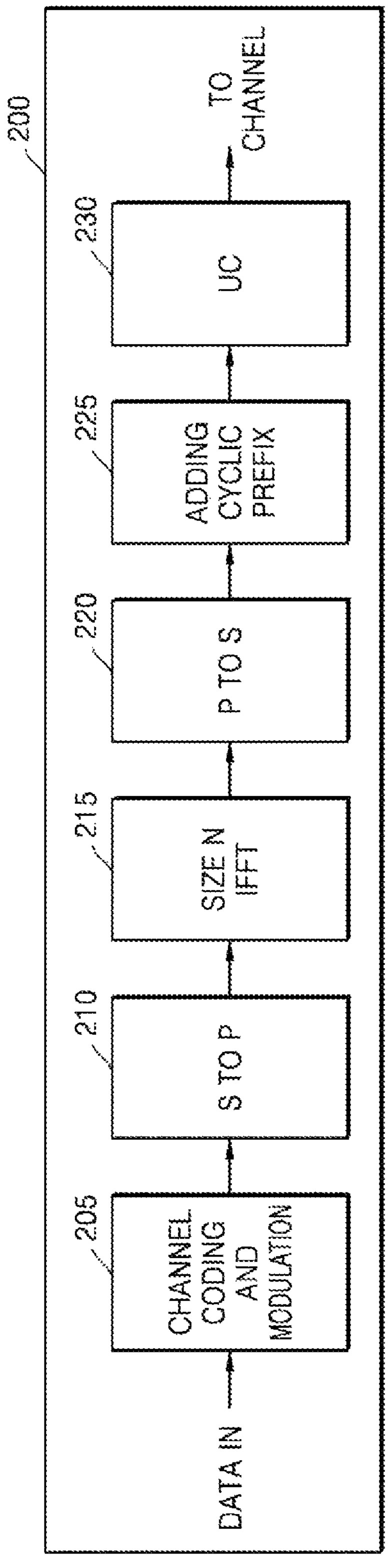
FIG. 2A illustrates an example wireless transmission path according to an embodiment of the present disclosure.
Figure 2B:
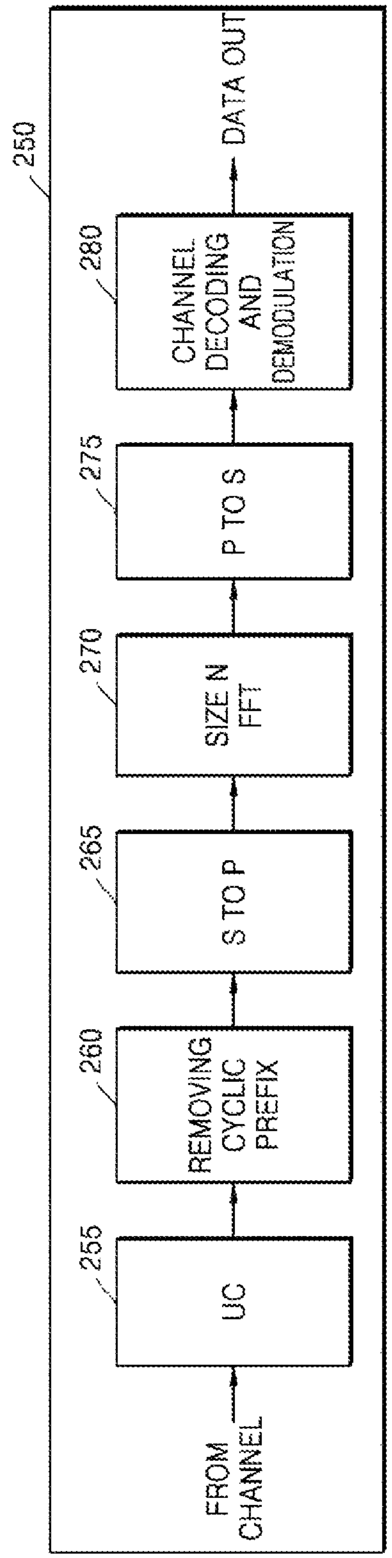
FIG. 2B illustrates an example wireless reception path according to an embodiment of the present disclosure.

FIGS. 2A and 2B illustrate example wireless transmission and reception paths according to an embodiment of the present disclosure. In the following description, the transmission path 200 can be described as being implemented in a gNB, such as the gNB 102, and the reception path 250 can be described as being implemented in a UE, such as the UE 116. However, it should be understood that the reception path 250 can be implemented in the gNB and the transmission path 200 can be implemented in the UE. In some embodiments, the reception path 250 is configured to support codebook design and structure for systems with 2D antenna arrays as described in embodiments of the present disclosure.

The transmission path 200 includes a channel coding and modulation block 205, a serial to parallel (S to P) block 210, a size N inverse fast Fourier transform (IFFT) block 215, a parallel to serial (P to S) block 220, an adding cyclic prefix block 225, and an up-converter (UC)230. The reception path 250 includes a down converter (DC)255, a removing cyclic prefix block 260, a serial to parallel (S to P) block 265, a size N fast Fourier transform (FFT) block 270, a parallel to serial (P to S) block 275, and a channel decoding and demodulation block 280.

In the transmission path 200, the channel coding and modulation block 205 receives a set of information bits, applies coding (such as low density parity check (LDPC) coding), and modulates input bits (such as using quadrature phase shift keying (QPSK) or quadrature amplitude modulation (QAM)) to generate a sequence of frequency domain modulation symbols. The serial-to-parallel (S-to-P) block 210 converts (such as demultiplexes) the serial modulation symbols into parallel data to generate N parallel symbol streams, where N is the IFFT/FFT size used in the gNB 102 and the UE 116. The size N IFFT block 215 performs IFFT operations on the N parallel symbol streams to generate a time domain output signal. The parallel-to-serial block 220 converts (such as multiplexes) the parallel time-domain output symbol from the size N IFFT block 215 to generate a serial time-domain signal. The adding cyclic prefix block 225 inserts a cyclic prefix into the time domain signal. The up-converter 230 modulates (such as up-converts) the output of the adding cyclic prefix block 225 to an RF frequency for transmission via a wireless channel. It is also possible to filter the signal at baseband before frequency conversion to an RF frequency.

The RF signal transmitted from the gNB 102 arrives at the UE 116 after passing through the wireless channel, and operations opposite to that at the gNB 102 are performed at the UE 116. The down converter 255 down-converts the received signal to a baseband frequency, and the removing cyclic prefix block 260 removes the cyclic prefix to generate a serial time domain baseband signal. The serial-to-parallel block 265 converts the time-domain baseband signal into a parallel time-domain signal. The size N FFT block 270 performs an FFT algorithm to generate N parallel frequency domain signals. The parallel-to-serial block 275 converts the parallel frequency domain signal into a sequence of modulated data symbols. The channel decoding and demodulation block 280 demodulates and decodes the modulated symbols to recover the original input data stream.

Each of the gNBs 101-103 may implement a transmission path 200 similar to transmitting to the UE 111-116 in the downlink, and may implement a reception path 250 similar to receiving from the UE 111-116 in the uplink. Similarly, each of the UE 111-116 may implement a transmission path 200 for transmitting to the gNBs 101-103 in the uplink and a reception path 250 for receiving from the gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented by configurable hardware or a mixture of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as discrete Fourier transform (DFT) and inverse discrete Fourier transform (IDFT) functions. It should be understood that for DFT and IDFT functions, the value of variable N can be any integer (such as 1, 2, 3, 4, etc.), while for FFT and IFFT functions, the value of variable N can be any integer as a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific needs. Furthermore, FIGS. 2A and 2B are intended to illustrate examples of types of transmission and reception paths that can be used in a wireless network. Any other suitable architecture can be used to support wireless communication in a wireless network.

Figure 3A:
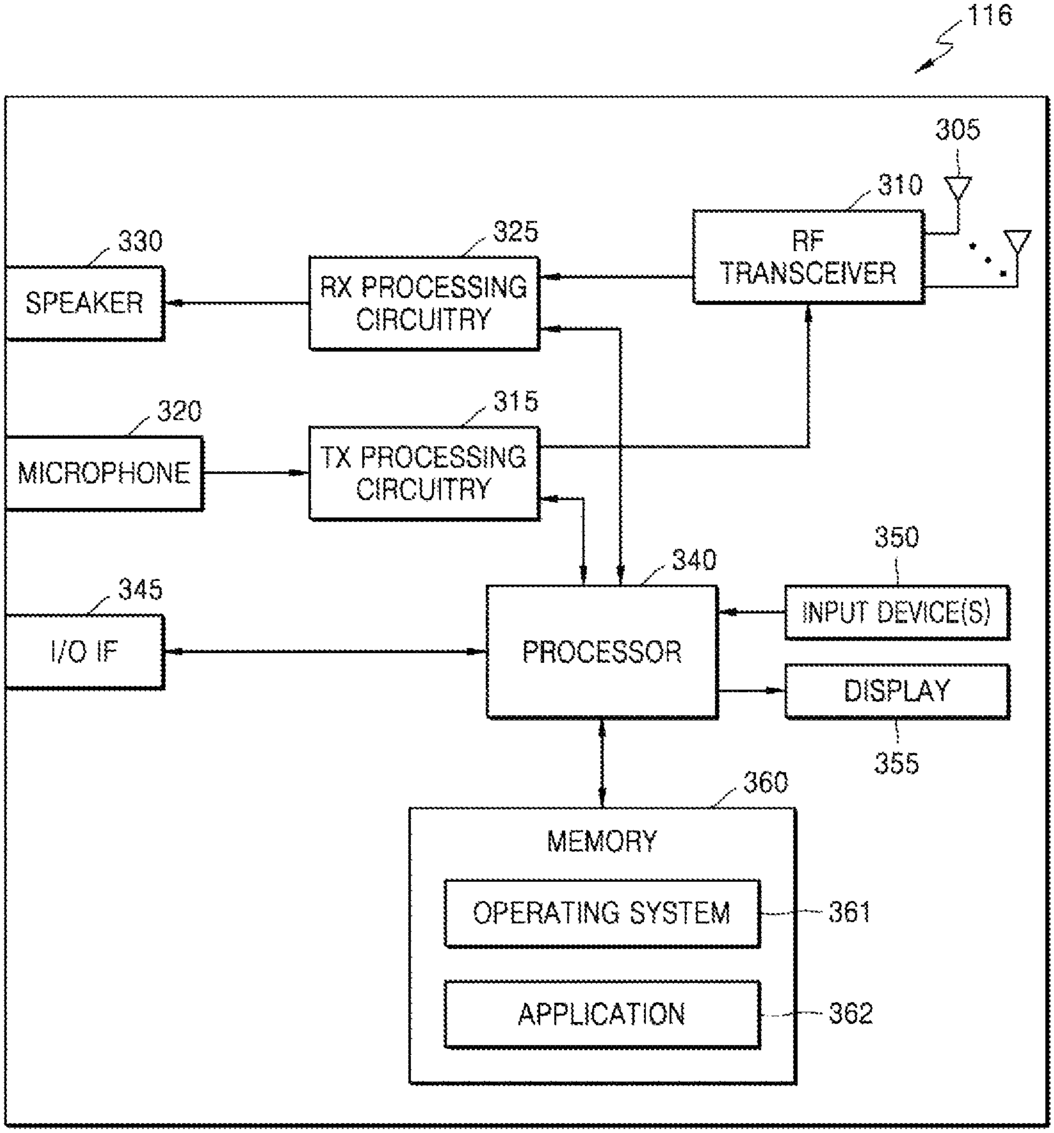
FIG. 3A illustrates an exemplary user equipment UE according to an embodiment of the present disclosure.

FIG. 3A illustrates an exemplary UE 116 according to an embodiment of the present disclosure. The embodiment of the UE 116 shown in FIG. 3A is for illustration only, and the UE 111-115 of FIG. 1 can have the same or similar configuration. However, the UE has a variety of configurations, and FIG. 3A does not limit the scope of the present disclosure to any specific implementation of the UE.

The UE 116 includes an antenna 305, a radio frequency (RF) transceiver 310, a transmitting (TX) processing circuit 315, a microphone 320, and a receiving (RX) processing circuit 325. The UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is transmitted to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor/controller 340 for further processing (such as for web browsing data).

The TX processing circuitry 315 receives analog or digital voice data from the microphone 320 or other outgoing baseband data (such as web data, e-mail, or interactive video game data) from the processor/controller 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor/controller 340 can include one or more processors or other processing devices and execute the OS 361 stored in the memory 360 in order to control the overall operation of the UE 116. For example, the processor/controller 340 could control the reception of forward channel signals and the transmission of reverse channel signals by the RF transceiver 310, the RX processing circuitry 325, and the TX processing circuitry 315 in accordance with well-known principles. In some embodiments, the processor/controller 340 includes at least one microprocessor or microcontroller.

The processor/controller 340 is also capable of executing other processes and programs resident in the memory 360, such as operations for channel quality measurement and reporting of systems with 2D antenna arrays as described in embodiments of the present disclosure. The processor/controller 340 can move data into or out of the memory 360 as required by an executing process. In some embodiments, the processor/controller 340 is configured to execute the applications 362 based on the OS 361 or in response to signals received from gNBs or an operator. The processor/controller 340 is also coupled to the I/O interface 345, which provides the UE 116 with the ability to connect to other devices, such as laptop computers and handheld computers. The I/O interface 345 is the communication path among these accessories and the processor/controller 340.

The processor/controller 340 is also coupled to the input device(s) 350 and display 355. The operator of the UE 116 can use the input device(s) 350 to input data into the UE 116. The display 355 may be a liquid crystal display, or other display capable of rendering text and/or at least limited graphics, such as from web sites. The memory 360 is coupled to the processor/controller 340. A part of the memory 360 could include a random access memory (RAM), and another part of the memory 360 could include a Flash memory or other read-only memory (ROM).

Although FIG. 3A illustrates one example of the UE 116, various changes can be made to FIG. 3A. For example, various components in FIG. 3A could be combined, further subdivided, or omitted and additional components could be added according to particular needs. As a particular example, the processor/controller 340 could be divided into multiple processors, such as one or more central processing units (CPUs) and one or more graphics processing units (GPUs). Also, while FIG. 3A illustrates the UE 116 configured as a mobile telephone or smartphone, UE could be configured to operate as other types of mobile or stationary devices.

Figure 3B:
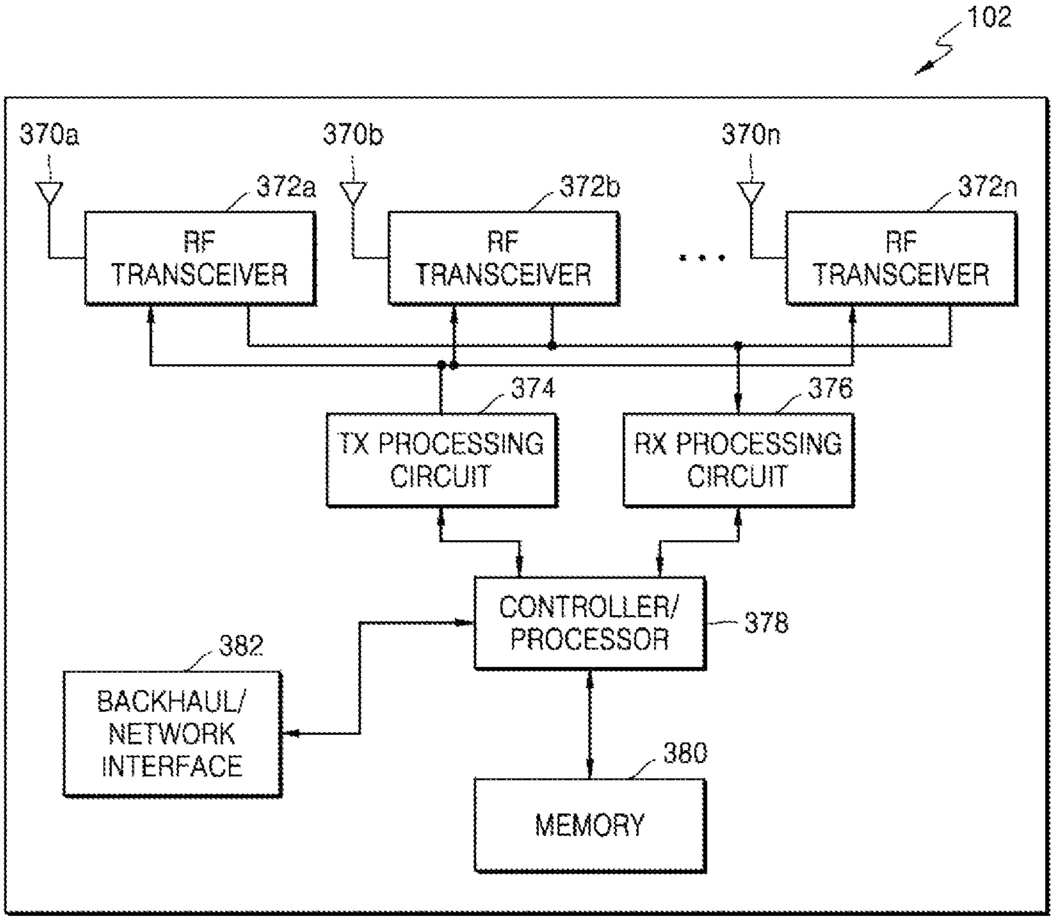
FIG. 3B illustrates an example base station gNB 102 according to an embodiment of the present disclosure.

FIG. 3B illustrates an example gNB 102 according to an embodiment of the present disclosure. The embodiment of the gNB 102 shown in FIG. 3B is for illustration only, and other gNBs of FIG. 1 can have the same or similar configuration. However, the gNBs have a variety of configurations, and FIG. 3B does not limit the scope of the present disclosure to any specific implementation of the gNBs. It should be noted that the gNB 101 and the gNB 103 can include the same or similar structures as the gNB 102.

As shown in FIG. 3B, the gNB 102 includes a plurality of antennas 370*a*-370*n*, a plurality of RF transceivers 372*a*-372*n*, a transmitting (TX) processing circuit 374, and a receiving (RX) processing circuit 376. In certain embodiments, one or more of the plurality of antennas 370*a*-370*n* includes 2D antenna arrays. The gNB 102 also includes a controller/processor 378, a memory 380, and a backhaul or network interface 382.

The RF transceivers 372*a*-372*n* receive an incoming RF signal from the antennas 370*a*-370*n*, such as a signal transmitted by the UE or other gNB. The RF transceivers 372*a*-372*n* down-convert the incoming RF signal to generate an IF or baseband signal. The IF or baseband signal is transmitted to the RX processing circuit 376, which generates a processed baseband signal by filtering, decoding and/or digitizing the baseband or IF signal. The RX processing circuit 376 transmits the processed baseband signal to the controller/processor 378 for further processing.

The TX processing circuit 374 receives analog or digital data (such as voice data, network data, email or interactive video game data) from the controller/processor 378. The TX processing circuit 374 encodes, multiplexes and/or digitizes the outgoing baseband data to generate a processed baseband or IF signal. The RF transceivers 372*a*-372*n* receive the outgoing processed baseband or IF signal from the TX processing circuit 374 and up-convert the baseband or IF signal into a RF signal for transmitting via antennas 370*a*-370*n*.

The controller/processor 378 can include one or more processors or other processing devices that control the overall operation of the gNB 102. For example, the controller/processor 378 can control the reception of forward channel signals and the transmission of reverse channel signals by the RF transceivers 372*a*-372*n*, the RX processing circuitry 376, and the TX processing circuitry 374 in accordance with well-known principles. The controller/processor 378 can also support additional functions, such as higher-level wireless communication functions. For example, the controller/processor 378 can perform a blind interference sensing (BIS) process performed by such as a BIS algorithm, and decode the received signal from which the interference signal is subtracted. A controller/processor 378 may support any of a variety of other functions in the gNB 102. In some embodiments, the controller/processor 378 includes at least one microprocessor or microcontroller.

The Controller/processor 378 is also capable of executing programs and other processes resident in memory 380, such as a basic OS. The controller/processor 378 can also support channel quality measurement and reporting for systems with 2D antenna arrays as described in embodiments of the present disclosure. In some embodiments, the controller/processor 378 supports communication among entities such as web RTC. The controller/processor 378 can move data into or out of the memory 380 as required by the execution process.

The controller/processor 378 is also coupled to the backhaul or network interface 382. The backhaul or network interface 382 allows the gNB 102 to communicate with other devices or systems through a backhaul connection or through a network. The backhaul or network interface 382 can support communication over any suitable wired or wireless connection(s). For example, when the gNB 102 is implemented as a part of a cellular communication system, such as a cellular communication system supporting 5G or new radio access technologies or NR, LTE or LTE-A, the backhaul or network interface 382 can allow the gNB 102 to communicate with other gNBs through wired or wireless backhaul connections. When the gNB 102 is implemented as an access point, the backhaul or network interface 382 can allow the gNB 102 to communicate with a larger network, such as the Internet, through a wired or wireless local area network or through a wired or wireless connection. The backhaul or network interface 382 includes any suitable structure that supports communication over a wired or wireless connection, such as an Ethernet or RF transceiver.

The memory 380 is coupled to the controller/processor 378. A part of the memory 380 can include RAM, while another part of the memory 380 can include a flash memory or other ROM. In certain embodiments, a plurality of instructions, such as a BIS algorithm, are stored in memory. The plurality of instructions are configured to cause the controller/processor 378 to execute the BIS process and decode the received signal after subtracting at least one interference signal determined by the BIS algorithm.

As will be described in more detail below, the transmission and reception paths of the gNB 102 (implemented using the RF transceivers 372_a_-372_n_, the TX processing circuit 374 and/or the RX processing circuit 376) support aggregated communication with FDD (Frequency Division Duplex) cells and TDD (Time Division Duplex) cells.

Although FIG. 3B illustrates an example of the gNB 102, various changes may be made to FIG. 3B. For example, the gNB 102 can include any number of each component shown in FIG. 3A. As a specific example, the access point can include many backhaul or network interfaces 382, and the controller/processor 378 can support routing functions to route data among different network addresses. As another specific example, although shown as including a single instance of the TX processing circuit 374 and a single instance of the RX processing circuit 376, the gNB 102 can include multiple instances of each (such as one per RF transceiver).

In addition, as described above, various embodiments of the present disclosure can also be applied to non-terrestrial networks NTNs. In the NTNs, according to whether satellites have an ability to decode 5G signals, it can be divided into two scenarios: a scenario based on transparent payloads; and a scenario based on regenerative payloads. In the scenario based on the transparent payloads, a satellite does not have the ability to decode 5G signals, and the satellite directly transmits the received 5G signals transmitted by a ground terminal to a NTN gateway on the ground. In the scenario based on the regenerative payloads, a satellite has the ability to decode 5G signals. The satellite decodes the received 5G signals transmitted by the ground terminal, and then re-encodes and transmits the decoded data, which can be directly transmitted to the NTN gateway on the ground, or transmitted to other satellites, and then transferred from other satellites to the NTN gateway on the ground.

In order not to obscure the inventive concept of the present disclosure, a detailed description of the implementation details of the non-terrestrial network NTNs is omitted here. In an embodiment of the present disclosure, a base station may be a satellite with a decoding capability of a base station (i.e., the scenario based on the transparent payloads) or a satellite without a decoding capability of a base station (i.e., the scenario based on the regenerative payloads). For the convenience of description, the satellites in the NTNs with or without the decoding ability of the base station are collectively described as base stations.

Exemplary embodiments of the present disclosure are further described below with reference to the accompanying drawings.

The text and drawings are provided as examples only to help the readers understand the present disclosure. They do not intend to limit and should not be interpreted as limiting the scope of this disclosure in any way. Although certain embodiments and examples have been provided, based on the disclosure herein, it will be apparent to those skilled in the art that changes may be made to the illustrated embodiments and examples without departing from the scope of the disclosure.

In the above-mentioned terrestrial network environment or non-terrestrial network environment, a case may occur that a terminal cannot decode downlink transmission correctly for a certain period of time, and a network does not know about this and still performs similar downlink scheduling. In this case, it will lead to a serious problem of downlink transmission efficiency reduction.

An embodiment of the present disclosure provides a method for transmitting uplink control information, according to a terminal transmitting uplink control information to a base station, wherein the uplink control information includes at least one of decoding statistical information for downlink transmission, suggestion information for downlink scheduling, or channel quality related information, so that the base station can obtain uplink control information fed back by the terminal, thereby assisting downlink scheduling of the base station and beneficial in improving the problem of reduced downlink transmission efficiency.

Figure 4:
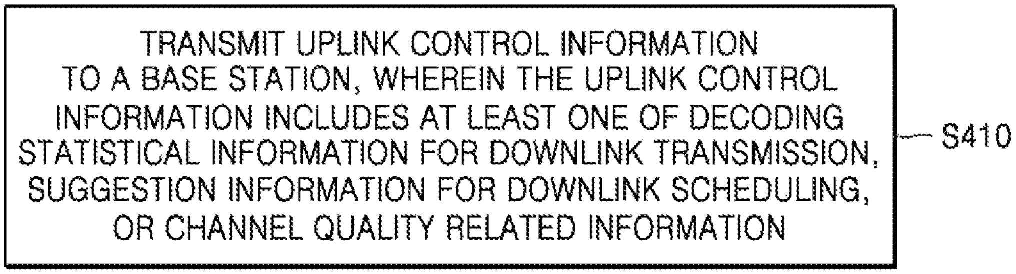
FIG. 4 illustrates a flowchart of a method for transmitting uplink control information provided by an embodiment of the present disclosure.

Referring to FIG. 4, FIG. 4 illustrates a flow chart of a method for transmitting uplink control information provided by an embodiment of the present disclosure. The method for transmitting uplink control information can be applied to a terminal, and the method can include step S410.

In step S410, transmitting uplink control information to a base station, herein, the uplink control information includes at least one of decoding statistical information for downlink transmission, suggestion information for downlink scheduling, or channel quality related information.

There are many implementations of the decoding statistical information for downlink transmission, the suggestion information for downlink scheduling, or the channel quality related information, and their particular implementations are described below, respectively. However, it can be understood that the implementations of the decoding statistical information for downlink transmission, the suggestion information for downlink scheduling, or the channel quality related information are not limited to the following descriptions, and variations of various implementations based on the above descriptions belong to the scope of this disclosure.

Several implementations of decoding statistical information for downlink transmission will be described as examples in the following.

As an implementation, the decoding statistical information for downlink transmission includes, but is not limited to, a decoding success ratio, a decoding failure ratio, cumulative times of decoding successes, cumulative times of decoding failures and the like of the received downlink transmission by the terminal within a preset time period.

For example, the downlink transmission may be PDSCH (Physical Downlink Shared Channel).

In the following, the calculation of decoding success ratio, decoding failure ratio, cumulative times of decoding successes and cumulative times of decoding failures of downlink transmission will be explained respectively with respect to a case where the downlink transmission is physical downlink shared channel PDSCH and multiple transmissions of the same Transport Block (TB) are counted as one time. However, it can be understood that any modification based on the following methods belongs to the protection scope of this disclosure.

For example, the decoding success ratio of downlink transmission may be the ratio between a number of PDSCH transmissions successfully decoded and a total number of PDSCH transmissions received within a preset time period. It can be expressed by the following equation 1.

$$R_{success}=N_{success}/N_{total} \quad \text{[Equation 1]}$$

Where Rsuccess is the decoding success ratio of downlink transmission, Nsuccess is the number of PDSCH transmissions successfully decoded within a predetermined period, and Ntotal is the total number of PDSCH transmissions received within the predetermined period.

For example, the decoding failure ratio of downlink transmission may be the ratio between a number of PDSCH transmissions unsuccessfully decoded and the total number of PDSCH transmissions received within a preset time period. It can be expressed by the following equation 2.

$$R_{fail}=N_{fail}/N_{total} \quad \text{[Equation 2]}$$

Where Rfail is the decoding failure ratio of downlink transmission, Nfail is the number of PDSCH transmissions unsuccessfully decoded within a preset time period, and Ntotal is the total number of PDSCH transmissions received within the preset time period.

For example, the cumulative times of successful decoding of downlink transmission may be the cumulative number of PDSCH transmissions successfully decoded within a preset time period.

For example, the cumulative times of decoding failures of downlink transmission may be a cumulative number of PDSCH transmissions unsuccessfully decoded within the preset time period.

The preset time period mentioned above may be, for example, a time window predefined by the system or in the standard, or a time window preconfigured by the base station. The terminal can statistically generate the above described decoding statistical information for the downlink transmission based on the predefined or preconfigured time window. For example, the terminal may statistically count the above described decoding statistical information for the downlink transmission based on downlink transmission within 1s, or the terminal may statistically count the decoding statistical information for downlink transmission once every 1s.

As an implementation, the decoding statistical information for downlink transmission includes, but is not limited to, a decoding success ratio, a decoding failure ratio, cumulative times of decoding successes, cumulative times of decoding failures, etc. of downlink transmission statistically generated by the terminal based on the predefined or preconfigured total number of downlink transmission. For example, Ntotal is the predefined or preconfigured total number of downlink transmission. If the cumulative number of downlink transmission received by the terminal reaches Ntotal, the terminal can statistically generate the decoding statistical information for downlink transmission, and the terminal can also statistically count the decoding statistical information for downlink transmission every Ntotal downlink transmission.

As an implementation, the decoding statistical information for downlink transmission includes, but is not limited to, the above decoding statistical information for downlink transmission statistically generated by the terminal based on the received unicast PDSCHs, and the broadcast PDSCHs are excluded from the statistics. For example, the terminal may only statistically count the PDSCHs corresponding to PDCCHs (Physical Downlink Control Channels) scrambled by UE-specific RNTI (Radio Network Temporary Identity), for example, PDSCHs corresponding to PDCCHs scrambled by C-RNTI (Cell RNTI) and CS-RNTI (Configured Scheduling RNTI), while PDSCHs corresponding to PDCCHs scrambled by cell-specific RNTI or UE-group specific RNTI are excluded from statistics.

As an implementation, the decoding statistical information for downlink transmission includes, but is not limited to, the above decoding statistical information for downlink transmission statistically generated by the terminal based on the received PDSCHs corresponding to PDCCHs scrambled by one or more specific RNTIs, while PDSCHs corresponding to PDCCHs scrambled by other RNTIs are excluded from statistics, the specific RNTIs can be predefined or preconfigured. For example, the terminal may only statistically count the above decoding statistical information for downlink transmission generated with the PDSCHs corresponding to PDCCHs scrambled by C-RNTI and/or CS-RNTI.

As an implementation, the decoding statistical information for downlink transmission includes, but is not limited to, the above decoding statistical information for downlink transmission statistically generated by the terminal based on the PDSCHs corresponding to PDCCHs received in a specific search space, while excluding PDSCHs corresponding to PDCCHs received in other search spaces from the statistics, the specific search space can be predefined or preconfigured.

As an implementation, if a PDCCH includes a Downlink Assignment Index (DAI) indicator, and when it is judged by DAI that there is PDCCH/PDSCH lost, the terminal can also count the lost PDCCH/PDSCH in the statistics of decoding statistical information for downlink transmission such as the decoding failure ratio and the cumulative times of decoding failures.

In addition, the decoding statistical information for downlink transmission included in the uplink control information may also be related to a second parameter. Next, several implementations of the second parameter are taken as examples to continue the introduction.

For example, the second parameter may include at least one of a service type or QoS (Quality of Service) of downlink scheduling data or an analog beam direction of downlink transmission.

As an implementation, the uplink control information may be related to the service type or QoS of the downlink scheduling data.

For example, the terminal may statistically count and transmit the above decoding statistical information for downlink transmission only for the eMBB (Enhanced Mobile Broadband) services, so that the base station can assist the downlink scheduling for the eMBB services based on the received decoding statistical information for downlink transmission.

For example, the terminal may statistically count and transmit the above decoding statistical information for downlink transmission only for the URLLC (ultra-reliable low latency communication) services, so that the base station can assist the downlink scheduling for the URLLC services based on the received decoding statistical information for downlink transmission.

For example, the terminal may statistically count and transmit the above decoding statistical information for downlink transmission for eMBB and URLLC services, respectively, so that the base station can assist the downlink scheduling for the eMBB and URLLC services, respectively, based on the received decoding statistical information for downlink transmission.

By associating the uplink control information with the QoS of downlink scheduling data, the base station is enabled to better schedule downlink for specific data services based on the uplink control information.

As an implementation, the uplink control information may be related to the analog beam direction of downlink transmission.

In the high frequency carrier scenario, due to the serious attenuation of radio signals, the base station needs to transmit signals on specific analog beams to improve the signal receiving energy. Different analog beams can be associated with different indexes of synchronization signal and PBCH blocks (SSBs) and/or different indexes of configured CSI- RS resources. Therefore, the above uplink control information can be associated with a SSB index and/or a CSI-RS resource index.

A terminal may statistically count and transmit the above decoding statistical information for downlink transmission for specific SSB indexes and/or CSI-RS resource indexes, for example, only for the SSB indexes and/or CSI-RS resource indexes associated with the current signal transmission. In another example, the terminal may also statistically count and transmit the above decoding statistical information for downlink transmission for a plurality of SSB indexes and/or CSI-RS resource indexes.

By associating the uplink control information with the analog beam direction of downlink transmission, the base station is enabled to assist the downlink scheduling on the corresponding analog beam based on the received decoding statistical information for downlink transmission statistically counted for a specific analog beam, so as to better perform downlink scheduling for the specific analog beam.

As an implementation, the uplink control information may be related to both the QoS of downlink scheduling data and the analog beam direction of downlink transmission, which will not be described in detail.

In addition, one can refer to the above description for the specific statistical calculation method for the second parameter, and details thereof will not be repeated here.

Several implementations of the suggestion information for downlink scheduling will be described as examples in the following.

For example, the suggestion information for downlink scheduling may include at least one of the following: a Modulation and Coding Scheme (MCS) value of PDSCH, a minimum MCS value, a maximum MCS value, a MCS offset, a MCS table, times of physical downlink shared channel PDSCH retransmissions, minimum times of the PDSCH retransmissions, maximum times of the PDSCH retransmissions, a number of PDSCH aggregation slots, a minimum number of the PDSCH aggregation slots, a maximum number of the PDSCH aggregation slots, times of PDSCH repeated transmissions, a minimum times of PDSCH repeated transmissions, a maximum times of PDSCH repeated transmissions, enabling or disabling of a downlink HARQ feedback function, a number of HARQ processes with the downlink HARQ feedback function enabled or disabled, which are suggested by the terminal for the base station.

For example, the MCS value of the PDSCH suggested by the terminal for the base station may be the MCS value used for PDSCHs transmitted to the terminal, which is suggested by the terminal to the base station.

For example, the minimum MCS value of the PDSCH suggested by the terminal for the base station may indicate that the terminal suggests the base station that the MCS value of the PDSCHs transmitted to the terminal should be higher than the minimum MCS value.

For example, the maximum MCS value of the PDSCH suggested by the terminal for the base station may indicate that the terminal suggests the base station that the MCS value of the PDSCHs transmitted to the terminal should be lower than the maximum MCS value.

For example, if the suggestion information for downlink scheduling includes the minimum MCS value and the maximum MCS value, the terminal may suggest the base station that the MCS value used for PDSCHs transmitted to the terminal should be lower than the maximum MCS value and higher than the minimum MCS value.

For example, the MCS offset of PDSCH suggested by the terminal for the base station may be a certain offset adjusted additionally based on the MCS of the original downlink scheduling strategy, which is suggested by the terminal for the base station, and the adjusted MCS value is used for the PDSCHs transmitted to the terminal. Here, the MCS offset may be, for example, an offset that only lowers the MCS of the original downlink scheduling strategy (i.e., only negative value), or an offset that lowers or raises the MCS of the original downlink scheduling strategy (i.e., positive value or negative value).

For example, the MCS table of PDSCH suggested by the terminal for the base station may be that the terminal suggests the base station selecting one of various predefined or preconfigured downlink MCS tables for downlink scheduling. When the downlink HARQ feedback function is disabled, the system can use MCS tables with lower bit rate to improve the reliability of downlink transmission, that is, the system can support multiple downlink MCS tables.

For example, the retransmission times of PDSCH suggested by the terminal for the base station may be the retransmission times suggested by the terminal for PDSCHs transmitted by the base station to the terminal.

For example, the minimum times of PDSCH retransmissions suggested by the terminal for the base station may indicate that the times of PDSCH retransmissions suggested by the terminal for PDSCHs transmitted by the base station to the terminal should be higher than the minimum times of retransmissions.

For example, the maximum times of retransmissions of PDSCH suggested by the terminal for the base station may indicate that the times of PDSCH retransmissions suggested by the terminal for PDSCHs transmitted by the base station to the terminal should be lower than the maximum times of retransmissions.

For example, if the suggestion information for downlink scheduling includes the minimum times of PDSCH retransmissions and the maximum times of PDSCH retransmissions, the terminal may suggest the base station that the times of PDSCH retransmissions transmitted by the base station to the terminal should be higher than the minimum times of retransmissions and lower than the maximum times of retransmissions.

For example, the number of PDSCH aggregation slots suggested by the terminal for the base station may be the number of aggregation slots suggested by the terminal for PDSCHs transmitted by the base station to the terminal.

For example, the minimum number of PDSCH aggregation slots suggested by the terminal for the base station may be that the number of PDSCH aggregation slots transmitted by the base station to the terminal should be higher than the minimum number of PDSCH aggregation slots, which is suggested by the terminal.

For example, the maximum number of PDSCH aggregation slots suggested by the terminal for the base station may be that the terminal suggests that the number of PDSCH aggregation slots transmitted by the base station to the terminal should be lower than the maximum number of PDSCH aggregation slots.

For example, if the suggestion information for downlink scheduling includes the minimum number of PDSCH aggregation slots and the maximum number of PDSCH aggregation slots, it may be that the terminal suggests that the number of PDSCH aggregation slots transmitted by the base station to the terminal should be higher than the minimum number of PDSCH aggregation slots and lower than the maximum number of PDSCH aggregation slots.

For example, the times of PDSCH retransmissions suggested by the terminal to the base station may be the times of retransmissions suggested by the terminal for PDSCHs transmitted by the base station to the terminal.

For example, the minimum times of PDSCH retransmissions suggested by the terminal for the base station may be that the terminal suggests that the times of retransmissions for PDSCHs transmitted to the terminal should be higher than the minimum times.

For example, the maximum times of PDSCH retransmissions suggested by the terminal for the base station may be that the terminal suggests that the times of retransmissions for PDSCHs transmitted to the terminal should be lower than the maximum times.

For example, if the suggestion information for downlink scheduling includes the minimum times of PDSCH retransmissions and the maximum times of PDSCH retransmissions, it may be that the times of PDSCH retransmission transmissions of the terminal should be higher than the minimum times and lower than the maximum times.

For example, the terminal suggests the base station disabling or enabling the downlink HARQ feedback function.

For example, the number of HARQ processes with downlink HARQ feedback function enabled or disabled suggested by the terminal for the base station may be the number of HARQ processes with downlink HARQ feedback function enabled or disabled for PDSCHs transmitted by the base station to the terminal.

It can be understood that in actual scheduling, the suggestion information for downlink scheduling transmitted by the terminal to the base station is only for the base station's reference, and the base station may or may not adopt the suggestion information for downlink scheduling transmitted by the terminal.

Several implementations of channel quality related information are introduced as examples below.

For example, the channel quality related information may include at least one of the following: a Channel Quality Indicator (CQI), a Rank Indicator (RI), a Precoding Matrix Indicator (PMI), etc.

It can be understood that the channel quality related information is not limited to the above implementations. For example, the channel quality related information can also include at least one of the following: a long-term Channel Quality Indicator (CQI), a CQI offset, or a CQI table suggested by the terminal.

Several implementations will be described below.

For example, the long-term channel quality indicator (CQI) may be a long-term CQI value transmitted by the terminal to the base station for reference in downlink scheduling of the base station, and the long-term CQI value may be a CQI measured by the terminal based on CSI-RSs received for a long period of time. For example, the terminal can perform linear averaging or sliding exponential weighted averaging processing on a signal-to-interference-and-noise ratio (SINR) which is measured based on multiple received CSI-RSs, to obtain the corresponding CQI value.

The sliding exponential weighted average of the SINR can also be understood as that the SINR is filtered by a higher layer (for example, RRC (Radio Resource Control) layer), which is also called Layer 3 (L3) filtering. That is, the physical layer transfers the measured SINR to the Layer 3, and then the Layer 3 filters the SINR. The L3 filtering of the SINR is similar to the existing L3 filtering of the RSRP. The filter coefficients of L3 filtering of SINR for purpose of calculating long-term CQI can be specially configured, or can be configured using the existing filter coefficients configuration for L3 filtering for other purposes. The terminal maps the SINR obtained after L3 filtering to the corresponding CQI value, which is the long-term CQI value, according to CQI definition.

Different from the existing instantaneous CQI measured based on received CSI-RS for one time, the long-term CQI value can eliminate the influence of small-scale fading and reflect the large-scale fading of wireless channel in a period of time, so that the base station can provide better downlink scheduling based on the long-term CQI value transmitted by the terminal, which is beneficial for improving the problem of reduced downlink transmission efficiency.

For example, the CQI offset transmitted by the terminal to the base station may be a certain offset adjusted additionally on the basis of the received instantaneous CQI reported by the terminal, which is suggested by the terminal for the base station, and perform downlink scheduling based on the adjusted CQI value. Here, the CQI offset may be, for example, an offset for only lowering CQI (i.e., only a negative value), or an offset for lowering or raising CQI (i.e., a positive value or a negative value).

For example, the CQI table suggested by the terminal transmitted by the terminal to the base station may be that the terminal suggests that the base station interpret the CQI reported by the terminal based on the table, or suggests that the base station configure the CQI reporting of the terminal based on the table.

In some cases, the system can support multiple CQI tables. For example, when the downlink HARQ feedback function is disabled, the system can use a CQI table with finer bit rate granularity to improve the downlink scheduling efficiency, that is, the bit rate difference between two adjacent CQI indexes is smaller, so the system can support multiple CQI tables with different bit rate granularities (for example, correspondences among CQI index, modulation mode, bit rate and transmission efficiency can be given in the tables). In another example, the system can also use a CQI table with lower BLER (Block Error Rate) target to make the downlink transmission have higher target transmission reliability, that is, the terminal can report the CQI value corresponding to a current channel according to the lower BLER target, so the system can support multiple CQI tables with different BLER targets.

When the system supports multiple CQI tables, the base station may configure the terminal to generate a feedback CQI based on one of the CQI tables, for example, to configure a CQI table used by the terminal through RRC signalling, and/or to indicate a CQI table used by currently triggered CQI feedback events through DCI signalling.

Therefore, by transmitting the CQI table suggested by the terminal which is transmitted by terminal to the base station, the base station can be assisted in better downlink scheduling, which is beneficial for improving the problem of reduced downlink transmission efficiency.

Next, several implementations in which the terminal transmits uplink control information to the base station are taken as examples to continue the introduction.

For example, the terminal can transmit uplink control information to the base station through physical layer signalling (such as PUCCH (physical uplink control channel) or piggyback of PUSCH (physical uplink shared channel)), or through MAC (medium access control) CE (control element) signalling, or through RRC messages.

As an implementation, before the terminal transmits the uplink control information to the base station, the uplink control information can be quantized into a certain number of bits for feedback.

Example tables for quantization of uplink control information described above are given below. Table 1 and Table 2 are used for quantization of decoding success ratio and decoding failure ratio of downlink transmission, respectively.

TABLE 1

Quantization table of decoding success ratio of PDSCH

| Information bit | decoding success ratio x |
|---|---|
| 00 | $0 < x \leq 0.6$ |
| 01 | $0.6 < x \leq 0.8$ |
| 10 | $0.8 < x \leq 0.9$ |
| 11 | $0.9 < x \leq 1$ |

TABLE 2

Quantization table of decoding failure ratio of PDSCH

| Information bit | decoding failure ratio x |
|---|---|
| 00 | $0 < x \leq 0.1$ |
| 01 | $0.1 < x \leq 0.2$ |
| 10 | $0.2 < x \leq 0.4$ |
| 11 | $0.4 < x \leq 1$ |

It can be understood that other decoding statistical information for downlink transmission can also be quantized in a similar way, and will not be repeated here.

Upon completion of the above quantization, the terminal may transmit the quantized uplink control information through physical layer signalling (such as PUCCH or piggyback of PUSCH), MAC CE signalling, or RRC signalling.

As an example, the terminal may transmit the quantized uplink control information to the base station through the PUCCH, and the specific transmitting manner is similar to transmitting other uplink control information such as HARQ-ACK or CSI through the PUCCH. For example, the quantized 2-bit uplink control information can be transmitted through PUCCH format 0 or format 1, and the PUCCH resource for transmitting the uplink control information can be indicated by DCI.

As an example, if the PUCCH used to transmit the quantized uplink control information overlaps with the PUSCH to be transmitted by the terminal in time, the uplink control information can also be transmitted by the piggyback of PUSCH, and the specific transmitting manner can be similar to transmitting other uplink control information through the piggyback of PUSCH, that is, the coded uplink control information is mapped to some resources of PUSCH.

As an example, the terminal can transmit the quantized uplink control information to the base station through MAC CE signalling, that is, a dedicated MAC CE signalling is defined to carry the quantized uplink control information.

As an example, the terminal may transmit the quantized uplink control message to the base station through RRC message. When the quantized uplink control information is fed back through a RRC message, the RRC message can carry more bits, and the terminal can not only report the quantized decoding statistical information for downlink transmission, but also report suggestion information for one or more downlink scheduling or channel quality related information, etc.

In addition, the terminal can transmit uplink control information to the base station at the required time, for example, it can also transmit uplink control information to the base station based on one or more of the following implementations.

As an implementation, the uplink control information can be periodically transmitted to the base station. For example, the terminal may transmit the uplink control information once every fixed period.

As an implementation, the terminal can autonomously trigger transmitting the uplink control information to the base station based on predefined or preconfigured conditions. For example, when the value of the uplink control information (for example, the value of decoding statistical information for downlink transmission) exceeds a preset threshold, the terminal autonomously triggers transmission of the uplink control information to the base station.

As an implementation, the uplink control information may be transmitted to the base station based on the received first signalling transmitted by the base station, which is used by the base station to trigger the terminal to transmit the uplink control information to the base station. The first signalling may include for example, MAC CE signalling or DCI trigger signalling, etc. The base station can trigger the terminal to transmit the uplink control information to the base station through the first signalling such as MAC CE signalling or DCI trigger signalling, that is, the terminal transmits the uplink control information to the base station only once after receiving the first signalling such as MAC CE signalling or DCI trigger signalling transmitted by the base station.

According to the method for transmitting uplink control information provided by the embodiment of the disclosure, uplink control information is transmitted to a base station by a terminal, wherein the uplink control information includes at least one of decoding statistical information for downlink transmission, suggestion information for downlink scheduling, or channel quality related information, so that the base station can obtain uplink control information fed back by the terminal, thereby assisting the downlink scheduling of the base station and helping to improve the problem of reduced downlink transmission efficiency.

Figure 5:
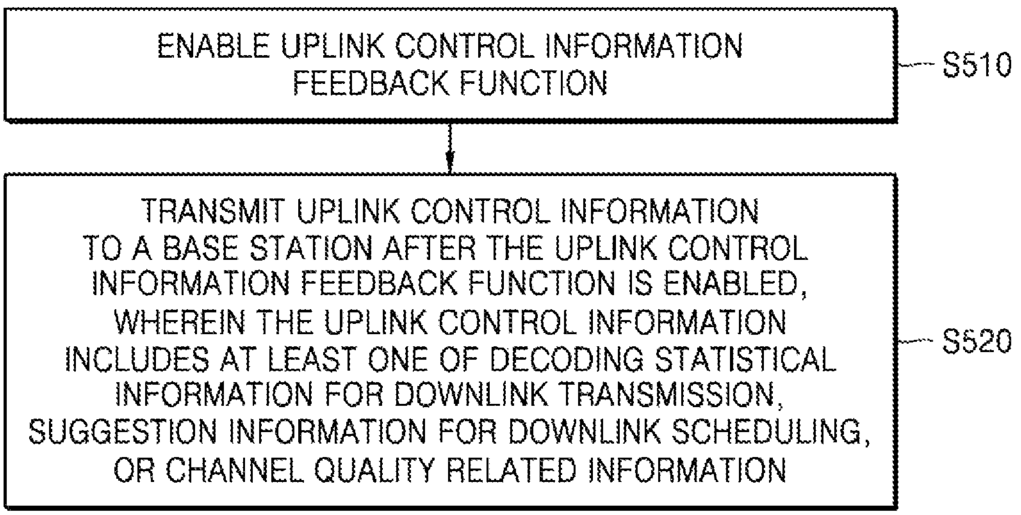
FIG. 5 illustrates a flowchart of a method for transmitting uplink control information provided by an embodiment of the present disclosure.

Referring to FIG. 5, FIG. 5 illustrates a flow chart of a method for transmitting uplink control information provided by an embodiment of the present disclosure. The method for transmitting uplink control information can be applied to a terminal, and the method may include step S510 and step S520.

In step S510, uplink control information feedback function is enabled.

Figure 6:
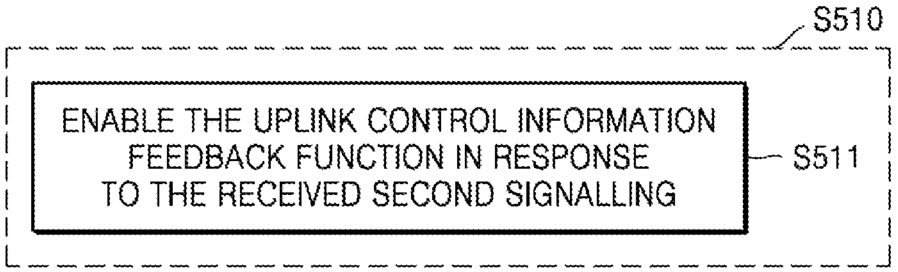
FIG. 6 illustrates a flowchart of a method for enabling uplink control information feedback function provided by an embodiment of the present disclosure.
Figure 7:
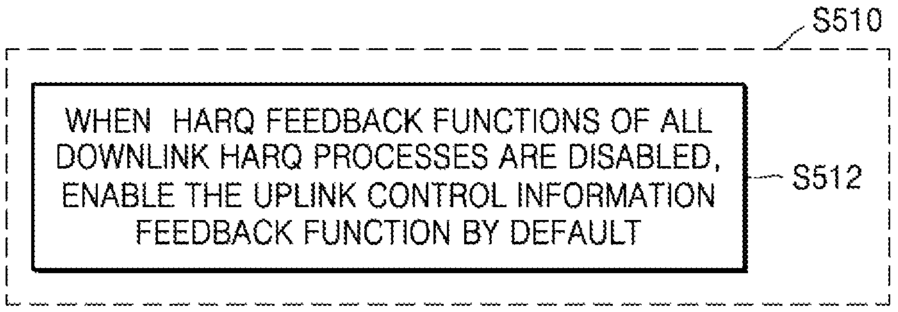
FIG. 7 illustrates a flowchart of a method for enabling uplink control information feedback function provided by another embodiment of the present disclosure.

There are various implementations of enabling the uplink control information feedback function. With reference to FIG. 6 and FIG. 7 as below, two implementations will be described as examples for illustration. It can be understood that the implementations of enabling the uplink control information feedback function are not limited to this.

Referring to FIG. 6 and FIG. 7, FIG. 6 illustrates a flow chart of a method for enabling the uplink control information feedback function provided by an embodiment of the present disclosure, and FIG. 7 illustrates a flow chart of a method for enabling the uplink control information feedback function provided by another embodiment of the present disclosure.

As an implementation of S510, referring to FIG. 6, step S510 may include step S511.

In step S511, the uplink control information feedback function is enabled based on received second signalling. As an implementation, the base station may instruct the terminal to configure/activate the uplink control information feedback function through the second signalling, that is, the terminal enables the uplink control information feedback function in response to receiving the second signalling. That is, the second signalling can be used to activate or configure the uplink control information feedback function of the terminal, so that the terminal has a capability to feed back the uplink control information to the base station.

As an implementation, enabling the uplink control information feedback function includes that the terminal is activated or configured to transmit uplink control information to the base station. That is, in response to the received second signalling, the terminal is activated or configured to transmit the uplink control information to the base station.

The second signalling may be higher layer signalling, for example, UE-specific RRC signalling, such as RRC configuration signalling or RRC enable signalling.

As an example, the RRC enable signalling or RRC configuration signalling may include parameters for indicating that the terminal is activated to transmit the uplink control information to the base station or the terminal is deactivated so that the terminal does not transmit the uplink control information to the base station. For example, an enable parameter (e.g., it may be value 1) indicates that the terminal is activated to transmit the uplink control information to the base station, or a disable parameter (e.g., it may be value 0) indicates that the terminal is deactivated so that the terminal does not transmit the uplink control information to the base station.

As an example, the RRC configuration signalling may also include at least one of the following:

(1) Content configuration of uplink control information. For example, the base station may configure the content of uplink control information to be one or more of decoding statistical information for downlink transmission, one or more of suggestion information for downlink scheduling, or one or more of channel quality related information through RRC configuration signalling.

(2) The configuration of length of time window for statistically generating uplink control information. For example, the base station can configure the length of the time window to be 1 second or 10 seconds through RRC configuration signalling.

(3) Periodicity configuration of uplink control information feedback. For example, the base station can configure the periodicity of uplink control information feedback to be 1 second or 10 seconds through RRC configuration signalling, and the terminal can trigger the terminal to transmit the uplink control information to the base station based on this periodicity configuration.

(4) Configuration of physical resources for feeding back uplink control information. For example, the base station may configure resources for periodic PUCCHs for feeding back uplink control information through RRC configuration signalling.

(5) Configuration of types of uplink control information feedback. For example, periodic feedback, aperiodic feedback, etc.

By enabling the uplink control information feedback function by receiving second signalling transmitted by the base station, the base station is enabled to schedule the terminal more flexibly according to the needs, which is more beneficial to the downlink scheduling of the base station, thereby further improving the problem of reduced downlink transmission efficiency.

As another implementation of S510, referring to FIG. 7, step S510 may include step S512.

In step S512, when the HARQ feedback functions of all downlink HARQ processes are disabled, the uplink control information feedback function is enabled by default.

As an implementation, enabling the uplink control information feedback function by default includes that the terminal is activated to transmit uplink control information to the base station. That is, when the HARQ feedback functions of all downlink HARQ processes are disabled, the terminal is activated to transmit uplink control information to the base station.

The base station does not need to instruct the terminal to enable the uplink control information feedback function through the second signalling. For example, when all the HARQ feedback functions of downlink HARQ processes are disabled, the terminal enables the uplink control information feedback function by default, and as long as the HARQ feedback function of at least one downlink HARQ process is not disabled, the terminal does not need to enable the uplink control information feedback function.

By enabling the uplink control information feedback function by default when the HARQ feedback functions of all downlink HARQ processes are disabled, the interactions between the terminal and the base station can be reduced, thereby reducing the network traffic, and the terminal can enable the uplink control information as required.

By enabling the uplink control information feedback function in the above various ways, the uplink control information feedback function is more flexible and diversified.

Referring to FIG. 5, the method for transmitting uplink control information may further include step S520.

In step S520, the uplink control information is transmitted to the base station after the uplink control information feedback function is enabled, wherein the uplink control information includes at least one of decoding statistical information for downlink transmission, suggestion information for downlink scheduling, or channel quality related information.

That is, when the terminal is activated or configured to transmit the uplink control information to the base station, the terminal may transmit uplink control information to the base station.

The implementation of uplink control information is similar or the same as that in the previous embodiment, and will not be described again.

The terminal may have an uplink control information feedback function, and when the uplink control information feedback function is enabled, it transmits uplink control information to the base station. In addition, the terminal may also transmit uplink control information to the base station when the uplink control information feedback function is not enabled. For example, the terminal may be triggered to transmit the uplink control information to the base station based on one or more ways in the previous embodiment, which is not described in detail here.

It can be understood that the above enabling of the uplink control information feedback function and the triggering of the uplink control information are independent processes. For example, the terminal can trigger the transmission of uplink control information based on any one or more of the above methods, regardless of whether the uplink control information feedback function is enabled or not; the terminal can also transmit uplink control information to the base station after the uplink control information feedback function is enabled, without triggering the transmission of uplink control information by any one or more of the above methods; the terminal may also transmit uplink control information to the base station after the uplink control information feedback function is enabled and the transmission of uplink control information is triggered by any one or more of the above methods.

Figure 8:
FIG. 8 illustrates a part of a flowchart of a method for transmitting uplink control information provided by an embodiment of the present disclosure.

Referring to FIG. 8, FIG. 8 illustrates a part of a flowchart of a method for transmitting uplink control information provided by an embodiment of the present disclosure.

As an implementation, the method for transmitting uplink control information may further include step S610.

In step S610, in response to received third signalling, disabling the uplink control information feedback function.

As an example, the third signalling may be higher layer signalling, for example, UE-specific RRC signalling, such as RRC release signalling or RRC disable signalling.

As an example, RRC release signalling or RRC disable signalling may include information indicating to release or deactivate (i.e., disable) the uplink control information feedback function, for example, it may be indicated by 1 bit, with a value of 1 indicating to disable the uplink control information feedback function and a value of 0 indicating to enable the uplink control information feedback function.

As an example, after receiving RRC enable signalling or RRC configuration signalling, and enabling the uplink control information feedback function, the terminal does not disable the uplink control information feedback function until receiving a corresponding RRC release signalling or RRC disable signalling.

By disabling the uplink control information feedback function in the above various ways, the base station is enabled to control the uplink control information feedback function, which is beneficial to assisting the base station in downlink scheduling.

According to the method for transmitting uplink control information provided by the embodiment of the disclosure, by enabling the uplink control information feedback function, uplink control information is transmitted to a base station after the uplink control information feedback function is enabled, wherein the uplink control information includes at least one of decoding statistical information for downlink transmission, suggestion information for downlink scheduling, or channel quality related information, so that the base station can obtain uplink control information fed back by the terminal, thereby assisting the downlink scheduling of the base station and helping to improve the problem of reduced downlink transmission efficiency.

The following is described taking specific cases in the non-terrestrial network NTN as examples. In the non-terrestrial network NTN, since the satellite is very high from the ground (for example, an altitude of a low-orbit satellite is 600 km or 1200 km, and an altitude of a synchronous satellite is close to 36000 km), the transmission delay of communication signals between ground terminals and satellites is extremely large, even reaching tens or hundreds of milliseconds, while the transmission delay is only tens of microseconds in the traditional terrestrial cellular network, such huge difference makes NTN need to use different physical layer technologies from those of the terrestrial network, which for example has an impact on physical layer technologies such as time and frequency synchronization/tracking, Timing Advance of uplink transmission, physical layer process, and HARQ retransmission sensitive to delayed transmission. One of the impacts of the extremely large transmission delay is that the Round Trip Time (RTT) of HARQ becomes longer, and too long waiting time will seriously reduce the transmission rate.

In order to improve the transmission rate, one method is to support a large number of parallel HARQ processes, but this is difficult to support both in hardware and software. Another method is to disable the HARQ feedback function. When the HARQ feedback function of downlink transmission is disabled, the terminal does not need to feed back ACK or NACK to the base station for the received downlink transmission, so the actual decoding condition of the network for downlink transmission is unknown. If the terminal cannot decode the downlink transmission correctly for a period of time, and the network is unaware of this and still performs similar downlink scheduling, the downlink transmission efficiency will be seriously reduced.

An embodiment of the present disclosure provides a method for transmitting uplink control information, by disabling the downlink HARQ feedback function, transmitting uplink control information to a base station when the downlink HARQ feedback function is disabled, wherein the uplink control information includes at least one of decoding statistical information for downlink transmission, suggestion information for downlink scheduling, or channel quality related information, so that the base station can obtain uplink control information fed back by the terminal, thereby assisting the downlink scheduling of the base station and beneficial in improving the problem of reduced downlink transmission efficiency.

Figure 9:
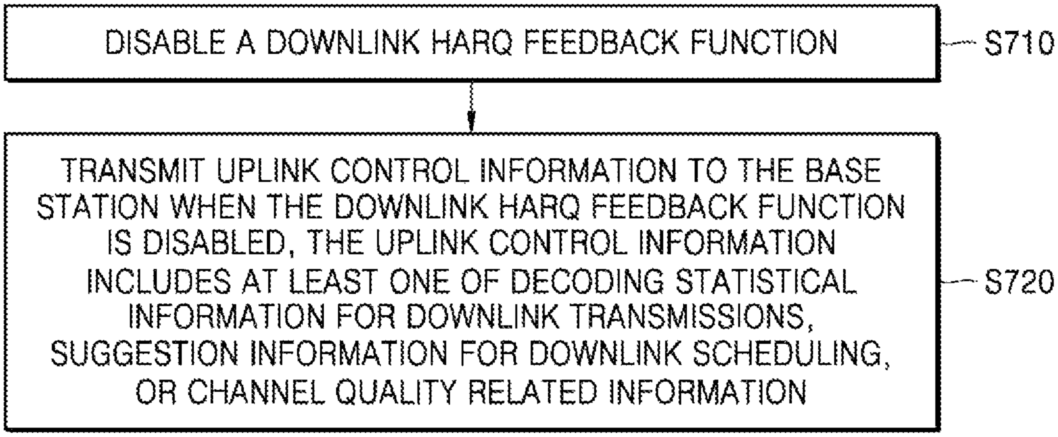
FIG. 9 illustrates a flowchart of a method for transmitting uplink control information provided by an embodiment of the present disclosure.

Referring to FIG. 9, FIG. 9 illustrates a flow chart of a method for transmitting uplink control information provided by an embodiment of the present disclosure. The method can be applied to a terminal, and the method may include step S710 and step S720.

In step S710, a downlink HARQ feedback function is disabled.

There are many implementations of disabling the downlink HARQ feedback function.

As an implementation, the terminal can disable the downlink HARQ feedback function by default.

As an implementation, the disabling of the downlink HARQ feedback function may only be used for the HARQ feedback function of PDSCH, but not for PDCCH. For example, the terminal may still feed back HARQ-ACKs for some PDCCHs carrying special control signallings (e.g., SPS (Semi-Persistent Scheduling) activation or release signalling, etc.). For another example, the disabling of downlink HARQ feedback function is applicable to both PDSCHs and some PDCCHs carrying special control signallings.

Figure 10:
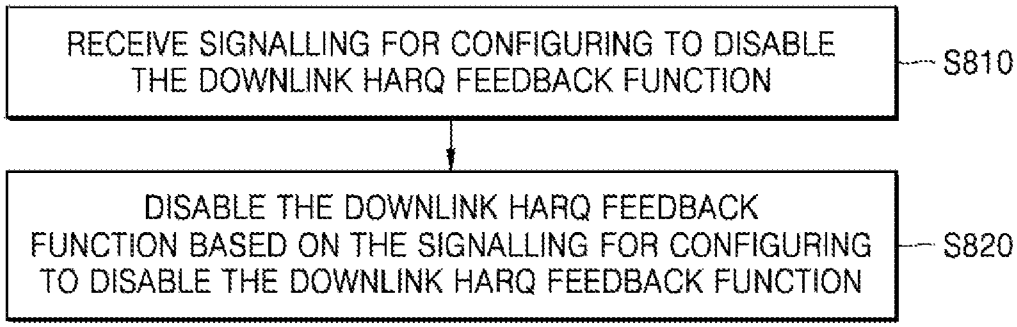
FIG. 10 illustrates a flowchart of a method for disabling downlink HARQ feedback function provided by an embodiment of the present disclosure.

As an implementation, referring to FIG. 10. FIG. 10 illustrates a flowchart of a method for disabling downlink HARQ feedback function provided by an embodiment of the present disclosure.

In step S810, signalling for configuring to disable a downlink HARQ feedback function is received.

For example, a base station may configure the HARQ feedback function of downlink transmission to be disabled through UE-specific RRC signalling.

In step S820, the downlink HARQ feedback function is disabled based on the signalling for configuring to disable the downlink HARQ feedback function.

As an implementation, the terminal may disable the feedback function of the downlink HARQ process corresponding to a first parameter, based on the first parameter.

The first parameter includes, but is not limited to, at least one of HARQ process numbers, a data service type or quality of service QoS, a downlink control information DCI transmission format used for downlink transmission, a radio network temporary identifier RNTI type used for the downlink transmission, a physical downlink control channel PDCCH search space used for the downlink transmission, or a scheduling type used for the downlink transmission.

As an example, the terminal may disable the downlink HARQ feedback function according to the HARQ process number. When the base station configures the downlink HARQ feedback function to be disabled for a specific HARQ process, the terminal can decide whether to feed back the corresponding HARQ-ACK according to the received HARQ process number used for downlink transmission. For example, the terminal does not feed back HARQ-ACK for the received downlink transmission carried by HARQ process #0, but feeds back HARQ-ACK for downlink transmission carried by other HARQ processes.

As an example, the terminal may disable the downlink HARQ feedback function according to the type or QoS of data service. When the base station configures the downlink HARQ feedback function to be disabled for data services with a specific type or QoS, the terminal can decide whether to feed back the corresponding HARQ-ACK according to the type or QoS of the received downlink data service. For example, if the base station only configures the downlink HARQ feedback function to be disabled for the URLLC service, the terminal may not feed back HARQ-ACK for the received downlink transmission carrying the URLLC service to improve the transmission rate of the URLLC service, but feed back HARQ-ACK for the received downlink transmission carrying the eMBB service.

As an example, the terminal may disable the downlink HARQ feedback function for the DCI transmission format used for downlink transmission. When the base station configures the downlink HARQ feedback function to be disabled for a specific DCI transmission format, the terminal may decide whether to feed back the corresponding HARQ-ACK according to the DCI format used for the received downlink transmission. For example, the terminal may not feed back HARQ-ACK for the received downlink transmission using one or several DCI formats, but feed back HARQ-ACK for the received downlink transmission using other DCI formats.

As an example, the terminal may disable the downlink HARQ feedback function according to the RNTI type used for downlink transmission. When the base station can configure the downlink HARQ feedback function to be disabled for a specific RNTI type, the terminal can decide whether to feed back the corresponding HARQ-ACK according to the RNTI type used for the received downlink transmission. For example, the terminal may not feed back HARQ-ACK for the received PDSCH corresponding to PDCCH scrambled with C-RNTI, while feed back HARQ-ACK for the received PDSCH corresponding to PDCCH scrambled with other types of RNTI.

As an example, the terminal may disable the downlink HARQ feedback function for PDCCH search space used for downlink transmission. When the base station can configure the downlink HARQ feedback function to be disabled for a specific PDCCH search space, the terminal can decide whether to feed back the corresponding HARQ-ACK according to the PDCCH search space used for the received downlink transmission. For example, the terminal may not feed back HARQ-ACK for received downlink transmission using one or several PDCCH search spaces, but feed back HARQ-ACK for received downlink transmission using a PDCCH search space.

As an example, the terminal may disable the downlink HARQ feedback function according to scheduling types used for downlink transmission. When the base station can configure the downlink HARQ feedback function to be disabled for a specific scheduling type, the terminal can decide whether to feed back the corresponding HARQ-ACK according to the scheduling type corresponding to the received downlink transmission. For example, the terminal may feed back HARQ-ACK for the received semi-statically scheduled downlink transmission, while not feed back HARQ-ACK for the received dynamically scheduled downlink transmission.

Figure 11:
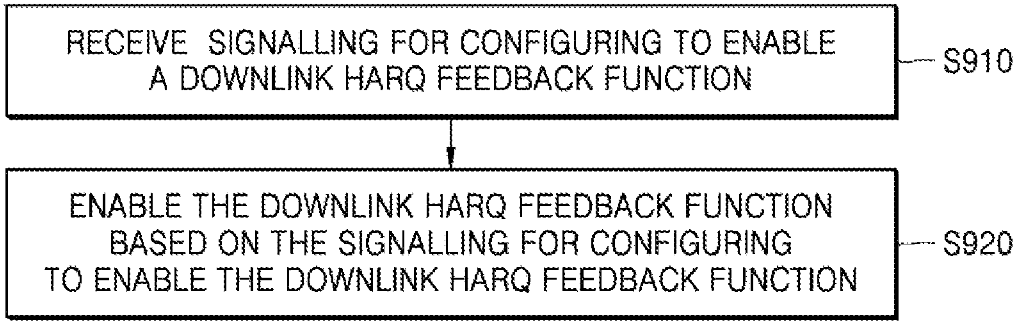
FIG. 11 illustrates a flowchart of a method for enabling downlink HARQ feedback function provided by an embodiment of the present disclosure.

In addition, the method for transmitting uplink control information may also include the step of enabling the downlink HARQ feedback function. Referring to FIG. 11, FIG. 11 illustrates a flowchart of a method for enabling downlink HARQ feedback function provided by an embodiment of the present disclosure.

In step S910, signalling for configuring to enable a downlink HARQ feedback function is configured.

In step S920, the downlink HARQ feedback function is enabled based on the signalling for configuring to enable the downlink HARQ feedback function.

It can be understood that the implementations of steps S910 to S920 is similar to those of steps S810 to S820. For example, the base station can configure the HARQ feedback function of downlink transmission to be enabled through a UE specific RRC signalling. For example, the terminal may enable the downlink HARQ feedback function based on the first parameter. The first parameter includes, but is not limited to, at least one of HARQ process numbers, a data service type or quality of service QoS, a downlink control information DCI transmission format used for downlink transmission, a radio network temporary identifier RNTI type used for the downlink transmission, a physical downlink control channel PDCCH search used for the downlink transmission, or a scheduling type used for the downlink transmission. Similar parts can be referred to the implementations of steps S810 to step S820, and will not be described again.

Referring to FIG. 9, the method for transmitting uplink control information may further include step S720.

In step S720, when the downlink HARQ feedback function is disabled, transmitting uplink control information to the base station, where the uplink control information includes at least one of decoding statistical information for downlink transmission, suggestion information for downlink scheduling, or channel quality related information.

The parts similar to those in step S720 will not be described again.

It can be understood that when the downlink HARQ feedback function is disabled, the indicator included in the DCI for indicating the first information related to the HARQ feedback function may be meaningless, for example, a HARQ process number, a new data indicator, a downlink assignment index, and an indicator related to PUCCH for carrying HARQ-ACK information, including a PUCCH resource indicator, a PDSCH-to-HARQ feedback timing indicator, and/or a TPC command for scheduled PUCCH. Therefore, the base station may configure the indicator for indicating the first information related to the downlink HARQ feedback function included in the DCI to be partially or completely removed, or to indicate second information different from the first information.

As an implementation, when the downlink HARQ feedback function is disabled, the indicator (for example, part or all of the above indicators) for indicating the first information related to the HARQ feedback function included in the DCI is removed by default. When the indicator for indicating the first information related to the HARQ feedback function included in the DCI is partially or completely removed, the DCI payload sizes monitored by the terminal when the downlink HARQ feedback function is enabled and disabled may be different. Correspondingly, the terminal can decide the payload size of the corresponding DCI to be monitored according to whether the downlink HARQ feedback function is disabled. If the downlink HARQ feedback function is disabled, the DCI monitored by the terminal does not need to include some or all of the above-mentioned indicators for indicating the first information related to the HARQ feedback function.

When the indicator for indicating the first information related to the HARQ feedback function included in the DCI is partially or completely removed, the payload of the DCI can be reduced, thereby improving the DCI transmission efficiency.

As an implementation, when the downlink HARQ feedback function is disabled, the indicator for indicating the first information related to the HARQ feedback function included in the DCI does not need to be removed, but is used for indicating second information different from the first information. The sizes of DCI payloads monitored by the terminal when the downlink HARQ feedback function is enabled and disabled can be the same. Correspondingly, the terminal can determine the interpretation of the indicator related to the HARQ feedback function included in DCI according to whether the downlink HARQ feedback function is disabled. If the downlink HARQ feedback function is disabled, the original indicator related to the HARQ feedback function can be used to indicate other information.

For example, when the indicator for indicating the first information related to the downlink HARQ feedback function included in the downlink control information DCI is used to indicate the second information different from the first information, the second information includes at least one of the following: related parameters of slot aggregation transmissions of PDSCH scheduled by current DCI, MCS table used for PDSCH transmission scheduled by current DCI, CQI table which should be used by the terminal for CSI reporting this time, and disabling or enabling of current HARQ feedback event.

When the indicator for indicating the first information related to the downlink HARQ feedback function included in the downlink control information DCI is used to indicate the second information different from the first information, the payload of DCI does not change, but it can indicate more useful information, thus improving the DCI transmission efficiency.

According to the method for transmitting uplink control information provided by the embodiment of the disclosure, by disabling the downlink HARQ feedback function, when the downlink HARQ feedback function is disabled, transmitting uplink control information to the base station, wherein the uplink control information includes at least one of: decoding statistical information for downlink transmission, suggestion information for downlink scheduling, or channel quality related information, so that the base station can obtain uplink control information fed back by the terminal, thereby assisting the downlink scheduling of the base station and helping to improve the problem of reduced downlink transmission efficiency.

Figure 12:
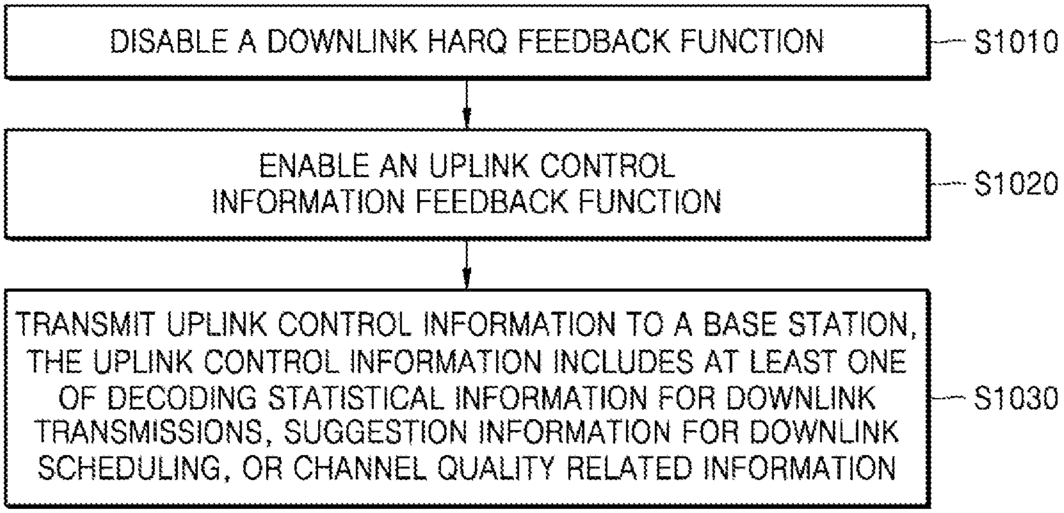
FIG. 12 illustrates a flowchart of a method for transmitting uplink control information provided by an embodiment of the present disclosure.

Referring to FIG. 12, FIG. 12 illustrates a flow chart of a method for transmitting uplink control information provided by an embodiment of the present disclosure. The method can be applied to a terminal, and the method may include step S1010, step S1020 and step S1030.

In step S1010, a downlink HARQ feedback function is disabled.

The implementation of step S1010 is similar to that of step S710 in the above embodiment, and will not be repeated here.

In step S1020, an uplink control information feedback function is enabled.

That is, the terminal is activated or configured to transmit uplink control information to the base station.

The implementation of step S1020 is similar to that of step S510 in the above embodiment, and will not be repeated here.

In step S1030, uplink control information is transmitted to the base station. The uplink control information includes at least one of decoding statistical information for downlink transmission, suggestion information for downlink scheduling, or channel quality related information.

The implementation of step S1030 is similar to that of step S410 in the above embodiment, and will not be repeated here.

According to the method for transmitting uplink control information provided by the embodiment of the disclosure, by disabling the downlink HARQ feedback function, enabling the uplink control information feedback function, and transmitting uplink control information to the base station, where the uplink control information includes at least one of: decoding statistical information for downlink transmission, suggestion information for downlink scheduling, or channel quality related information, so that the base station can obtain uplink control information fed back by the terminal, thereby assisting the downlink scheduling of the base station and helping to improve the problem of reduced downlink transmission efficiency.

Figure 13:
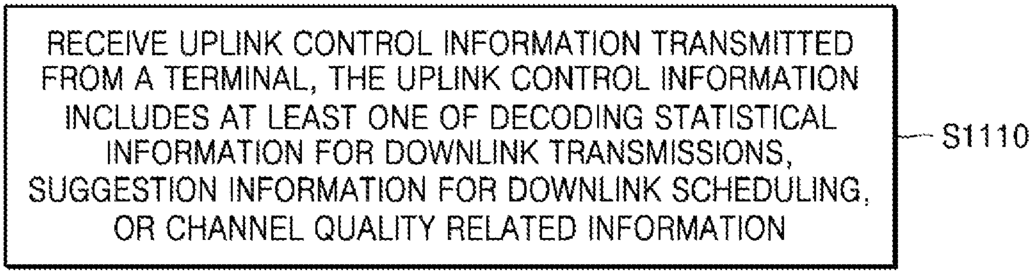
FIG. 13 illustrates a flowchart of a method for receiving uplink control information provided by an embodiment of the present disclosure.

Referring to FIG. 13, FIG. 13 illustrates a flow chart of a method for receiving uplink control information provided by an embodiment of the present disclosure. The method can be applied to a base station, and the method may include step S1110.

In step S1110, uplink control information transmitted from a terminal is received. The uplink control information includes at least one of decoding statistical information for downlink transmission, suggestion information for downlink scheduling, or channel quality related information.

For example, the decoding statistical information for downlink transmission may include at least one of the following: a decoding success ratio, a decoding failure ratio, cumulative times of decoding successes, or cumulative times of decoding failures of the downlink transmission.

For example, the suggestion information for downlink scheduling may include at least one of the following: a Modulation and Coding Scheme (MCS) value of PDSCH, a minimum MCS value, a maximum MCS value, a MCS offset, a MCS table, times of physical downlink shared channel PDSCH retransmissions, minimum times of the PDSCH retransmissions, maximum times of the PDSCH retransmissions, a number of PDSCH aggregation slots, a minimum number of the PDSCH aggregation slots, a maximum number of the PDSCH aggregation slots, times of PDSCH repeated transmissions, a minimum times of PDSCH repeated transmissions, a maximum times of PDSCH repeated transmissions, enabling or disabling of a downlink HARQ feedback function, a number of HARQ processes with the downlink HARQ feedback function enabled or disabled, which are suggested by the terminal for the base station.

For example, the channel quality related information may include at least one of the following: long-term CQI, a CQI offset, or a CQI table suggested by the terminal.

For example, the uplink control information is related to a second parameter.

For example, the second parameter may include at least one of: a service type or QoS of downlink scheduled data or an analog beam direction of downlink transmission.

For example, the receiving the uplink control information transmitted by a terminal includes at least one of the follow: receiving the uplink control information transmitted by the terminal through physical layer signalling; receiving the uplink control information transmitted by the terminal through MAC CE signalling; or receiving the uplink control information transmitted by the terminal through RRC signalling.

For the specific implementation, the corresponding detailed description in the embodiment on the terminal side may be referred, which will not be repeated here.

Figure 14:
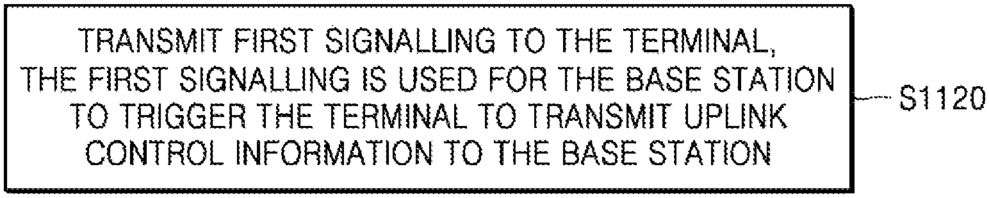
FIG. 14 illustrates a part of flowchart of a method for receiving uplink control information provided by an embodiment of the present disclosure.

Referring to FIG. 14, FIG. 14 illustrates a part of flowchart of a method for receiving uplink control information provided by an embodiment of the present disclosure.

As an implementation, the method for receiving uplink control information may further include step S1120.

In step S1120, a first signalling is transmitted to the terminal. The first signalling is used for the base station to trigger the terminal to transmit uplink control information to the base station.

For the specific implementation of the first signalling, the corresponding detailed description in the embodiment on the terminal side may be referred, which will not be repeated here.

By transmitting by the base station the first signalling to the terminal to trigger the terminal to transmit the uplink control information to the base station, the base station is enabled to control to schedule the terminal more flexibly according to the needs, which is more beneficial to the downlink scheduling of the base station, thus further improving the problem of reduced downlink transmission efficiency.

Figure 15:
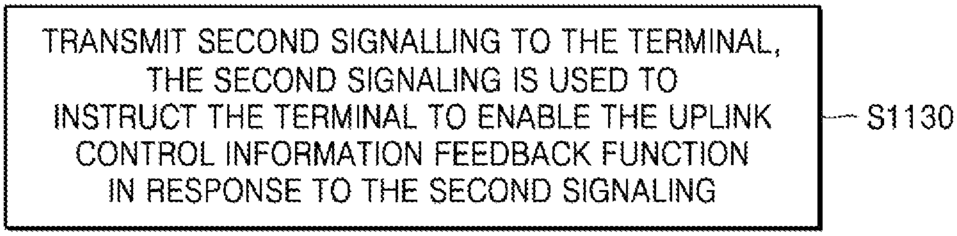
FIG. 15 illustrates a part of flowchart of a method for receiving uplink control information provided by an embodiment of the present disclosure.

Referring to FIG. 15, FIG. 15 illustrates a part of flowchart of a method for receiving uplink control information provided by an embodiment of the present disclosure.

As an implementation, the method for receiving uplink control information may further include step S1130.

In step S1130, second signalling is transmitted to the terminal. The second signalling is used to instruct the terminal to enable an uplink control information feedback function in response to the second signalling.

For example, the second signalling may include at least one of the following: a parameter for indicating that the terminal is activated to transmit uplink control information to the base station or deactivated to not transmit the uplink control information to the base station; content configuration of the uplink control information; length configuration of time window for statistically generating the uplink control information; type configuration of uplink control information feedback; periodicity configuration of uplink control information feedback; or physical resource configuration for feeding back uplink control information.

For the specific implementation of the second signalling, the corresponding detailed description in the embodiment on the terminal side may be referred, which will not be repeated here.

By transmitting the second signalling by the base station to the terminal to enable the uplink control information feedback function, that is, the terminal is enabled through the second signalling so that the terminal is activated or configured to transmit uplink control information to the base station, so that the base station can schedule the terminal more flexibly according to the needs, which is more beneficial for the downlink scheduling of the base station, thereby further improving the problem of reduced downlink transmission efficiency.

Figure 16:
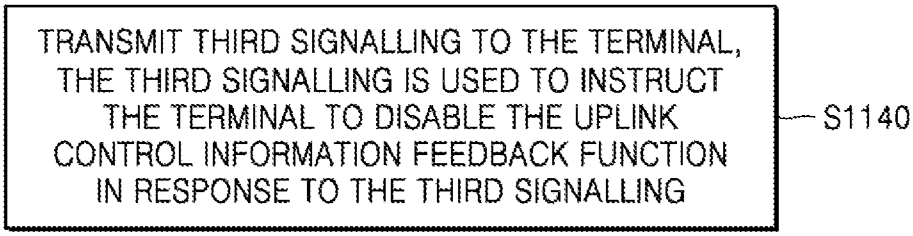
FIG. 16 illustrates a part of flowchart of a method for receiving uplink control information provided by an embodiment of the present disclosure.

Referring to FIG. 16, FIG. 16 illustrates a part of flowchart of a method for receiving uplink control information provided by an embodiment of the present disclosure.

As an implementation, the method for receiving uplink control information may further include step S1140.

In step S1140, third signalling is transmitted to the terminal. The third signalling is used to instruct the terminal to disable the uplink control information feedback function in response to the third signalling.

For the specific implementation of the third signalling, the corresponding detailed description in the embodiment on the terminal side may be referred, which will not be repeated here.

By transmitting the third signalling by the base station to the terminal to disable the uplink control information feedback function, the base station is enabled to disable the uplink control information feedback function as needed, for example, when the network bandwidth is insufficient or the load of the base station is heavy, which is more beneficial for the downlink scheduling of the base station, thereby further improving the problem of reduced downlink transmission efficiency.

Figure 17:
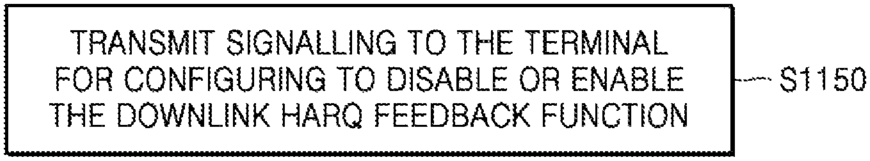
FIG. 17 illustrates a part of flowchart of a method for receiving uplink control information provided by an embodiment of the present disclosure.

Referring to FIG. 17, FIG. 17 illustrates a part of flowchart of a method for receiving uplink control information provided by an embodiment of the present disclosure.

As an implementation, the method for receiving uplink control information may further include step S1150.

In step S1150, signaling for configuring to disable or enable a downlink HARQ feedback function is transmitted to the terminal.

For the specific implementation of step S1150, the corresponding detailed description in the embodiment on the terminal side may be referred, which will not be repeated here.

By transmitting the signalling for disabling or enabling the downlink HARQ feedback function to the terminal by the base station, the base station is enabled to enable or disable the downlink HARQ feedback function based on the signalling, so that when the transmission delay is large, the signalling for configuring to disable the downlink the HARQ feedback function is transmitted to the terminal, so that the terminal does not need to feed back ACK or NACK to the base station for the received downlink transmission, thus improving the transmission rate, and the signalling for configuring to enable the downlink HARQ feedback function is transmitted to the terminal when required by the base station, so that downlink scheduling of the base station is more flexible.

Referring to FIG. 18, FIG. 18 illustrates a part of flowchart of a method for receiving uplink control information provided by an embodiment of the present disclosure.

As an implementation, the method for receiving the uplink control information may further include step S1160.

In step S1160, the base station may configure to disable or enable a function of a downlink HARQ feedback process corresponding to a first parameter, based on the first parameter.

The first parameter may include at least one of HARQ process numbers, a data service type or quality of service QoS, a downlink control information DCI transmission format used for downlink transmission, a radio network temporary identifier RNTI type used for the downlink transmission, a physical downlink control channel PDCCH search space used for the downlink transmission, or a scheduling type used for the downlink transmission.

As an example, the base station may configure to disable or enable the downlink HARQ feedback function according to the HARQ process number. For example, the base station may configure the enabling or disabling of the downlink HARQ feedback function only for HARQ process #0, or for example, the base station may configure the enabling or disabling of the downlink HARQ feedback function for each HARQ process. Correspondingly, the terminal can decide whether to feed back the corresponding HARQ-ACK according to the received HARQ process number used for the downlink transmission. For example, the terminal does not feed back HARQ-ACK for the received downlink transmission carried by HARQ process #0, but feeds back HARQ-ACK for the received downlink transmission carried by other HARQ processes.

As an example, the base station may configure to disable or enable the downlink HARQ feedback function according to the type or QoS of data service. For example, the base station may configure the enabling or disabling the downlink HARQ feedback function only for eMBB or URLLC services. For another example, the base station may configure the enabling or disabling of the downlink HARQ feedback function for eMBB and URLLC, respectively. Correspondingly, the terminal can decide whether to feed back the corresponding HARQ-ACK according to the type or QoS of the received downlink data service. For example, if the base station only configures the downlink HARQ feedback function to be disabled for the URLLC service, the terminal does not feed back HARQ-ACK for the received downlink transmission carrying the URLLC service to improve the transmission rate of the URLLC service, but feed back HARQ-ACK for the received downlink transmission carrying the eMBB service.

As an example, the base station can configure the enabling or disabling of downlink HARQ feedback function for a specific DCI transmission format. For example, the base station may configure the enabling or disabling of the downlink HARQ feedback function only for one or several DCI formats. For another example, the base station may respectively configure the enabling or disabling of the HARQ feedback function for different DCI formats. Correspondingly, the terminal may decide whether to feed back the corresponding HARQ-ACK according to the DCI format used for the received downlink transmission. For example, the terminal may not feed back HARQ-ACK for the received downlink transmission using one or several DCI formats, but feed back HARQ-ACK for the received downlink transmission using other DCI formats.

As an example, the base station can configure the enabling or disabling of downlink HARQ feedback function for a specific RNTI type. For example, the base station may configure the enabling or disabling of the downlink HARQ feedback function only for one or several RNTI types. For another example, the base station may respectively configure the enabling or disabling of the HARQ feedback function for different RNTI types. Correspondingly, the terminal can decide whether to feed back the corresponding HARQ-ACK according to the RNTI type used for the received downlink transmission. For example, the terminal may not feed back HARQ-ACK for PDSCH corresponding to PDCCH scrambled with C-RNTI, while feed back HARQ-ACK for PDSCH corresponding to PDCCH scrambled with other types of RNTI.

As an example, the base station can configure the enabling or disabling of downlink HARQ feedback function for specific PDCCH search spaces. For example, the base station can configure the enabling or disabling of the downlink HARQ feedback function only for certain one or several PDCCH search spaces. For another example, the base station may respectively configure the enabling or disabling of the HARQ feedback function for different PDCCH search spaces. Correspondingly, the terminal may decide whether to feed back the corresponding HARQ-ACK according to the PDCCH search space used for the received downlink transmission. For example, the terminal may not feed back HARQ-ACK for the received downlink transmission using certain one or several PDCCH search spaces, but feed back HARQ-ACK for the received downlink transmission using other PDCCH search spaces.

As an example, the base station can configure the enabling or disabling of downlink HARQ feedback function for a specific scheduling type. For example, the base station can configure the enabling or disabling the downlink HARQ feedback function only for dynamic scheduling. For another example, the base station can configure the enabling or disabling of the downlink HARQ feedback function for dynamic scheduling and semi-static scheduling, respectively. Correspondingly, the terminal can decide whether to feed back the corresponding HARQ-ACK according to the scheduling type corresponding to the received downlink transmission. For example, the terminal may feed back HARQ-ACK for the received semi-statically scheduled downlink transmission, while not feed back HARQ-ACK for the received dynamically scheduled downlink transmission.

By configuring to disable or enable the downlink HARQ feedback function based on the first parameter, the downlink scheduling of the base station is more flexible, the downlink transmission efficiency can be improved, and the base station can be assisted in downlink scheduling.

Referring to FIG. 19, FIG. 19 illustrates a part of flowchart of a method for receiving uplink control information provided by an embodiment of the present disclosure.

As an implementation, the method for receiving uplink control information may further include step S1170.

In step S1170, when the downlink HARQ feedback function is disabled, the indicator for indicating the first information related to the downlink HARQ feedback function included in the DCI is configured to be removed or used for indicating second information different from the first information.

When the downlink HARQ feedback function is disabled, since there is no retransmission triggered by NACK feedback, the transmission reliability of PDSCH will be affected. Slot aggregation can be used to compensate for the influence of the disabling of HARQ feedback function on the transmission reliability of PDSCH. The aggregated PDSCH occupies more physical resources in time domain, so that the received energy of signals can be accumulated in time, thus improving the reliability of PDSCH transmission. The transmission mode of PDSCH in these multiple slots can be overall rate matching, that is, the rate matching of PDSCH is based on the total number of REs contained in all slots, or repeated transmission, that is, the rate matching of PDSCH is only based on the number of REs contained in one slot.

If PDSCH is configured to apply slot aggregation transmission, the number of slots for aggregation may be semi-statically configured, that is, the number of aggregated slots is indicated by higher layer signalling (such as RRC signalling or MAC CE signalling), and the number of aggregated slots is used for PDSCH within a period of time; or, the number of slots for aggregation is dynamically configured, that is, the number of aggregated slots is indicated by physical layer signalling (e.g., DCI), and the number of aggregated slots is only used for PDSCH scheduled by the current DCI. When the number of aggregated slots is indicated by DCI, the base station may indicate a specific value based on a set of predefined or preconfigured number of aggregated slots.

Therefore, as an implementation, when the downlink HARQ feedback function is disabled and the slot aggregation of PDSCH is configured, the indicator for indicating the first information related to the downlink HARQ feedback function included in DCI can be used to indicate the related parameters of the slot aggregation transmission of PDSCH scheduled by current DCI, and can also be understood as indicating the resource allocation information of PDSCH in time domain, for example, the indicator for indicating the first information related to downlink HARQ feedback function included in DCI can be used to indicate the number of aggregated slots of PDSCH (which can also be understood as the number of slots allocated for PDSCH in time domain), or the position and/or number of aggregated slots of PDSCH (which can also be understood as the position and/or number of resources allocated for PDSCH in time domain).

In addition to slot aggregation, the base station can also use MCS table with lower code rate to compensate for the influence of the disabling of HARQ feedback function on PDSCH transmission reliability. The MCS table used by PDSCH can be semi-statically configured, that is, the MCS table is indicated by higher layer signalling (such as RRC signalling or MAC CE), the MCS table is used to interpret the MCS values of PDSCH within a period of time; or, the MCS table used by PDSCH is dynamically configured, that is, the current MCS table is indicated by physical layer signalling (e.g., DCI), the MCS table is only used to interpret the MCS value indicated in the current DCI. When the MCS table is indicated by DCI, the base station may indicate a specific value based on a set of predefined or preconfigured MCS tables.

Therefore, as an implementation, when the downlink HARQ feedback function is disabled and a plurality of MCS tables are configured through higher layer signalling, the indicator for indicating the first information related to the downlink HARQ feedback function included in the DCI can be used to indicate the MCS table used for PDSCH transmission scheduled by the current DCI.

In addition, the base station can also use a CQI table with lower BLER target to compensate for the influence of disabling of HARQ feedback function on PDSCH transmission reliability. The CQI table used by PDSCH can be semi-statically configured, that is, the CQI table is indicated by higher layer signalling (such as RRC signalling or MAC CE), the CQI table is used for CQI reporting within a certain period of time; or, the CQI table is dynamically configured, that is, the CQI table is indicated by physical layer signalling (e.g., DCI), and the CQI table is only used for CQI reporting triggered by the current DCI. When the CQI table is indicated by DCI, the base station may indicate a specific value based on a set of CQI tables predefined or preconfigured by higher layer signalling.

Therefore, as an implementation, when the downlink HARQ feedback function is disabled and a plurality of CQI tables are configured through higher layer signalling, if a DCI triggers CSI reporting, the indicator for indicating the first information related to the downlink HARQ feedback function included in the DCI can be used to indicate the CQI table that the terminal should use for CSI reporting this time.

As an implementation, after the base station configures the downlink HARQ feedback function to be disabled through higher layer signalling, it can also dynamically indicate that the current HARQ feedback event is disabled or enabled through the indicator for indicating the first information related to the downlink HARQ feedback function included in DCI. The premise of realizing this configuration is that the DCI payload monitored by the terminal is the same when the downlink HARQ feedback function is disabled and enabled. For example, the base station indicates that the current HARQ feedback event is disabled/enabled through 1-bit dedicated indicator of DCI or a reserved value of the existing DCI field. If DCI indicates that the current HARQ feedback event is enabled, the indicator for indicating the first information related to downlink HARQ feedback function included in the DCI reuses the existing interpretation, and if DCI indicates that the current HARQ feedback event is disabled, the indicator for indicating the first information related to downlink HARQ feedback function included in the DCI is interpreted as other information, for example, it is used to indicate related parameters of the slot aggregation transmission of PDSCH scheduled by current DCI, MCS table used for PDSCH transmission scheduled by current DCI, CQI table which should be used by the terminal for CSI reporting this time, etc., that is, the interpretation of the same indicator is related to whether the current HARQ feedback event is disabled or not.

By configuring to partially or completely remove the indicator for indicating the first information related to the downlink HARQ feedback function included in the DCI, the payload of DCI can be reduced so as to improve the DCI transmission efficiency. In addition, the indicator for indicating the first information related to the downlink HARQ feedback function included in the DCI can also be configured to indicate the second information different from the first information, for this case, although the payload of DCI has not changed, it can indicate more useful information, so as to improve the DCI transmission efficiency.

According to the method for transmitting uplink control information provided by the embodiment of the disclosure, by receiving uplink control information transmitted by a terminal, which includes at least one of decoding statistical information for downlink transmission, suggestion information for downlink scheduling, or channel quality related information, the base station is enabled to obtain the uplink control information fed back by the terminal, thereby assisting in the downlink scheduling of the base station and being beneficial to improving the problem of reduced downlink transmission efficiency.

In addition, as mentioned above, in order to improve the transmission rate, one method is to disable the HARQ feedback function, but the relevant details of disabling the HARQ feedback function are still unclear.

An embodiment of the present disclosure provides a method for configuring downlink HARQ feedback function, which can improve the downlink transmission efficiency and assist the base station in downlink scheduling by configuring the feedback function of the downlink HARQ process corresponding to a first parameter based on the first parameter.

Referring to FIG. 20, FIG. 20 illustrates a flow chart of a method for configuring downlink HARQ feedback function provided by an embodiment of the present disclosure. The method can be applied to a base station, and the method may include step S1210.

In step S1210, disabling or enabling the feedback function of the downlink HARQ process corresponding to a first parameter is configured based on the first parameter.

For example, the first parameter may include at least one of HARQ process number, data service type or QoS, a DCI transmission format used for downlink transmission, a RNTI type used for downlink transmission, a DCCH search space used for downlink transmission, or a scheduling type used for downlink transmission.

For the specific implementation of step S1210, one can refer to the related descriptions of step S1150 in the previous embodiments, and they will not be repeated here.

By configuring to disable or enable the downlink HARQ feedback function based on the first parameter, the downlink scheduling of the base station is more flexible.

Referring to FIG. 21, FIG. 21 illustrates a part of a flowchart of a method for configuring downlink HARQ feedback function provided by an embodiment of the present disclosure.

As an implementation, the method for configuring the downlink HARQ feedback function may further include step S1220.

In step S1220, when the downlink HARQ feedback function is disabled, the indicator for indicating the first information related to the downlink HARQ feedback function included in the DCI is configured to be removed or used for indicating second information different from the first information.

When the indicator for indicating the first information related to the downlink HARQ feedback function included in the downlink control information DCI is configured to be used to indicate second information different from the first information, the second information may include at least one of the following: related parameters of slot aggregation transmissions of PDSCH scheduled by current DCI, a MCS table used for PDSCH transmission scheduled by current DCI, a CQI table which should be used by the terminal for CSI reporting this time, and disabling or enabling of a current HARQ feedback event.

For the specific implementation of step S1220, one can refer to the related descriptions of step S1160 in the previous embodiments, and they will not be repeated here.

By configuring to partially or completely remove the indicator for indicating the first information related to the downlink HARQ feedback function included in DCI, the payload of DCI can be reduced so as to improve the DCI transmission efficiency. In addition, the indicator for indicating the first information related to the downlink HARQ feedback function included in DCI can also be configured to indicate the second information different from the first information, for this case, although the payload of DCI has not changed, it can indicate more useful information, so as to improve the DCI transmission efficiency.

Figure 22:
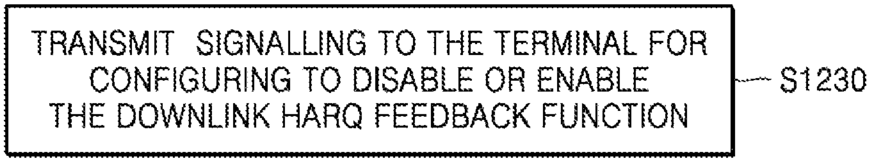
FIG. 22 illustrates a part of a flowchart of a method for configuring downlink HARQ feedback function provided by an embodiment of the present disclosure.

Referring to FIG. 22, FIG. 22 illustrates a part of a flowchart of a method for configuring downlink HARQ feedback function provided by an embodiment of the present disclosure.

As an implementation, the method for configuring the downlink HARQ feedback function may further include step S1230.

In step S1230, signalling for configuring to disable or enable the downlink HARQ feedback function is transmitted to the terminal.

For the specific implementation of step S1230, the corresponding description in the embodiment on the terminal side may be referred, which will not be repeated here.

By transmitting the signalling for disabling or enabling the downlink HARQ feedback function to the terminal by the base station, the base station is enabled to enable or disable the downlink HARQ feedback function based on the signalling, so that when the transmission delay is large, the signalling for configuring to disable the downlink HARQ feedback function is transmitted to the terminal, so that the terminal does not need to feed back ACK or NACK to the base station for the received downlink transmission, thus improving the transmission rate, and the signalling for configuring to enable the downlink HARQ feedback function is transmitted to the terminal, so that the downlink scheduling of the base station is more flexible.

According to the method for configuring the downlink HARQ feedback function provided by the embodiment of the disclosure, the downlink transmission efficiency can be improved and the base station can be assisted in downlink scheduling, by configuring the downlink HARQ feedback function to be disabled or enabled based on the first parameter.

Figure 23:
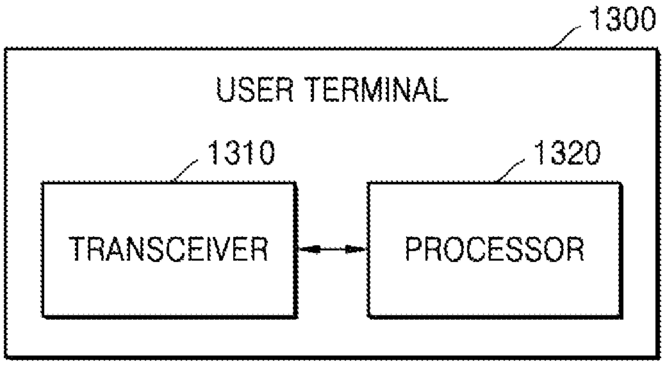
FIG. 23 is a block diagram illustrating a structure of a user equipment according to an embodiment of the present disclosure.

FIG. 23 is a block diagram showing the structure of a user equipment 1300 according to an embodiment of the present disclosure.

Referring to FIG. 23, the user equipment 1300 includes a transceiver 1310 and a processor 1320. The transceiver 1310 is configured to transmit and receive signals to and from the outside. The processor 1320 is configured to perform the above method for transmitting uplink control information. The user equipment 1300 can be implemented in the form of hardware, software or a combination of hardware and software, so that it can perform the method for transmitting uplink control information described in the present disclosure.

Figure 24:
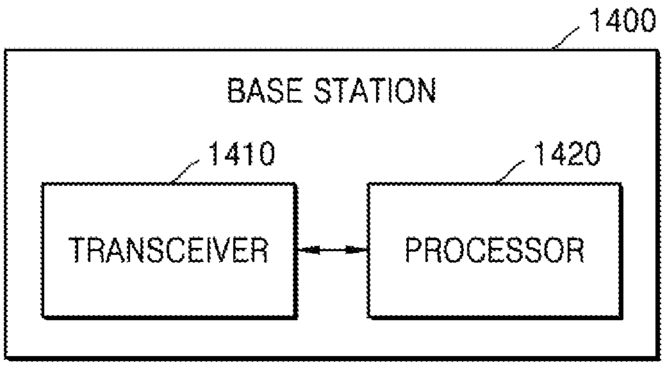
FIG. 24 is a block diagram illustrating a structure of a base station according to an embodiment of the present disclosure.

FIG. 24 is a block diagram showing the structure of a base station 1400 according to an embodiment of the present disclosure.

Referring to FIG. 24, a base station 1400 includes a transceiver 1410 and a processor 1420. The transceiver 1410 is configured to transmit and receive signals to and from the outside. The processor 1420 is configured to perform the above-mentioned method for receiving uplink control information and the method for configuring downlink HARQ feedback function. The base station 1400 can be implemented in the form of hardware, software or a combination of hardware and software, so that it can perform the method for receiving uplink control information and the method for configuring downlink HARQ feedback function described in the present disclosure.

Figure 25:
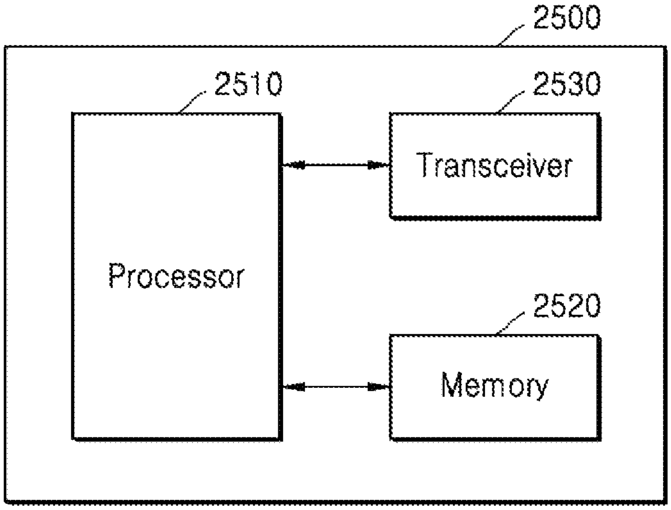
FIG. 25 is a block diagram illustrating a structure of a user equipment according to an embodiment of the present disclosure.

FIG. 25 is a block diagram illustrating a structure of a user equipment 2500 according to an embodiment of the present disclosure.

As shown in FIG. 25, the UE 2500 may include a processor 2510, a transceiver 2530, and memory 2520. The memory 2520 stores instructions that, when executed by the processor 2510, cause the processor to perform the transmission method as described above with reference to FIGS. 1-24. However, components of the UE 2500 are not limited to the examples set forth above. For example, the UE may include more components or less components than the components set forth above. In addition, the processor 2510, the transceiver 2530, and the memory 2520 may be implemented in the form of one chip.

The processor 2510 may control a series of processes in which the UE 2500 may be operated according to the above-described embodiments of the disclosure. For example, the processor 2510 may control to transmit uplink control information to a base station. And, the processor 2510 may be at least one processor.

The transceiver 2530 may transmit a signal to and receive a signal from a gNB or another UE. The signal set forth above may include control information and data. For this purpose, the transceiver 2530 may include a radio frequency (RF) transmitter up-converting and amplifying a frequency of a transmitted signal, an RF receiver performing low-noise amplification and frequency down-conversion on a received signal, and the like. In addition, the transceiver 2530 may receive a signal through a radio channel and output the signal to the processor 2510, and may transmit, through the radio channel, a signal that is output from the processor 2510.

The memory 2520 may store at least one of information transmitted and received by the transceiver 2530 or information generated by the processor 2510. In addition, the memory 2520 may store control information or data included in an acquired signal. The memory 2520 may include a storage medium such as read-only memory (ROM), random access memory (RAM), a hard disk, compact disc ROM (CD-ROM), and a digital versatile disc (DVD), or a combination of storage media. Further, the memory 2520 may include a plurality of memories.

Figure 26:
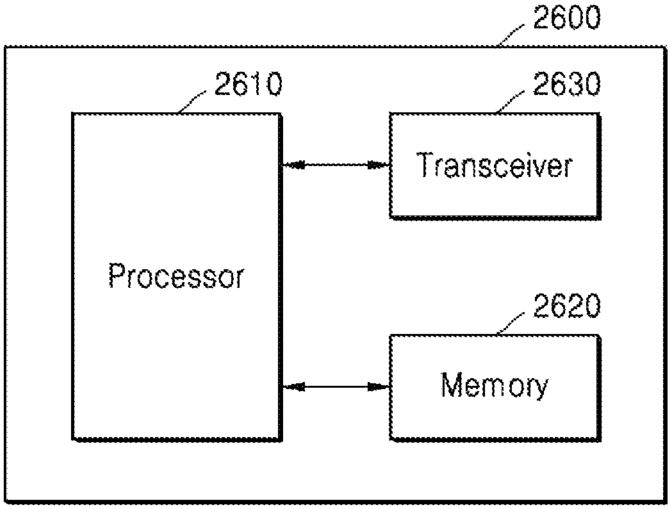
FIG. 26 is a block diagram illustrating a structure of a base station according to an embodiment of the present disclosure.

FIG. 26 is a block diagram of a base station 2600 according to an embodiment of the disclosure. As shown in FIG. 26, the base station 2600 of the disclosure may include a processor 2610, a transceiver 2630, and memory 2620. However, components of the base station 2600 are not limited to the examples set forth above. For example, the base station 2600 may include more components or less components than the components set forth above. In addition, the processor 2610, the transceiver 2630, and the memory 2620 may be implemented in the form of one chip.

According to the above-described communication method of the base station 2600, the transceiver 2630 and the processor 2610 may be operated.

The transceiver 2630 may transmit a signal to and receive a signal from a UE. Here, the signal may include control information and data. For this purpose, the transceiver 2630 may include an RF transmitter up-converting and amplifying a frequency of a transmitted signal, an RF receiver performing low-noise amplification and frequency down-conversion on a received signal, and the like. However, this is merely an example of the transceiver 2630, and components of the transceiver 2630 are not limited to the RF transmitter and the RF receiver.

In addition, the transceiver 2630 may receive a signal through a radio channel and output the signal to the processor 2610, and may transmit, through the radio channel, a signal that is output from the processor 2610.

The processor 2610 may store a program and data required for operations of the base station 2600. In addition, the processor 2610 may store control information or data included in a signal acquired by the base station 2600. The processor 2610 may include memory including a storage medium, such as ROM, RAM, a hard disk, CD-ROM, and a DVD, or a combination of storage media.

The processor 2610 may control a series of processes to allow the base station 2600 to be operated according to the above-described embodiment of the disclosure. For example, the processor 2610 may control to receive uplink control information transmitted by a terminal.

The memory 2620 may store at least one of information transmitted and received by the transceiver 2630 or information generated by the processor 2610. In addition, the memory 2620 may store control information or data included in an acquired signal. The memory 2620 may include a storage medium such as ROM, RAM, a hard disk, CD-ROM, and a DVD, or a combination of storage media. Further, the memory 2620 may include a plurality of memories.

At least one embodiment of the present disclosure also provides a non-transitory computer-readable recording medium having stored thereon a program, which when executed by a computer, performs the methods described above.

In several embodiments provided in this application, it should be understood that the disclosed apparatus and method can also be implemented in other ways. The apparatus embodiments described above are merely illustrative, for example, the flowcharts and block diagrams in the drawings show the architecture, functions and operations of possible implementations of apparatuses, methods and computer program products according to various embodiments of the present disclosure. In this regard, each block in the flowchart or block diagram may represent a module, program segment or part of code including one or more executable instructions for implementing specified logical functions. It should also be noted that in some alternative implementations, the functions marked in the blocks may also occur in a different order from those marked in the drawings. For example, two consecutive blocks can actually be executed in substantially parallel, and sometimes they can be executed in reverse order, depending on the functions involved. It should also be noted that each block in the block diagrams and/or flowcharts, and combinations of blocks in the block diagrams and/or flowcharts, can be implemented with dedicated hardware-based systems that perform specified functions or actions, or can be implemented with combinations of dedicated hardware and computer instructions.

Various embodiments of the present disclosure may be implemented as computer readable code embodied on a computer readable recording medium from a specific perspective. A computer-readable recording medium can be any data storage device that can store data readable by a computer system. Examples of the computer-readable recording medium may include read-only memory (ROM), random access memory (RAM), compact disk read-only memory (CD-ROM), magnetic tape, floppy disk, optical data storage device, carrier wave (e.g., data transmission via the Internet), and the like. Computer readable recording media can be distributed by computer systems connected via a network, and thus computer readable codes can be stored and executed in a distributed manner. Furthermore, functional programs, codes, and code segments for implementing various embodiments of the present disclosure can be easily explained by those skilled in the art to which the embodiments of the present disclosure are applied.

It will be understood that embodiments of the present disclosure may be implemented in hardware, software, or a combination of hardware and software. Software may be stored as program instructions or computer readable code executable on a processor on a non-transitory computer readable medium. Examples of non-transitory computer-readable recording media include magnetic storage media (e.g., ROM, floppy disk, hard disk, etc.) and optical recording media (e.g., CD-ROM, digital video disk (DVD), etc.). Non-transient computer-readable recording media can also be distributed on computer systems coupled by networks, so that computer-readable codes can be stored and executed in a distributed manner. The medium can be read by a computer, stored in a memory, and executed by a processor. The various embodiments may be implemented by a computer or a portable terminal including a controller and a memory, and the memory may be an example of a non-transitory computer readable recording medium suitable for storing program (s) having instructions to implement the embodiments of the present disclosure. The present disclosure can be realized by a program having code for concretely implementing the apparatus and method described in the claims, which is stored in a machine (or computer) readable storage medium. The program can be electronically carried on any medium, such as a communication signal transmitted via a wired or wireless connection, and the present disclosure suitably includes equivalents thereof.

According to an aspect of the present disclosure, there is provided a method for transmitting uplink control information of a terminal, comprising: transmitting uplink control information to a base station, wherein the uplink control information includes at least one of: decoding statistical information for downlink transmission, suggestion information for downlink scheduling, or channel quality related information.

According to the method for transmitting uplink control information provided by the present disclosure, the transmitting uplink control information to the base station includes at least one of the following: transmitting the uplink control information to the base station periodically; transmitting the uplink control information to the base station when a predefined or preconfigured condition is met; or transmitting the uplink control information to the base station in response to the received first signalling transmitted by the base station, wherein the first signalling is used for the base station to trigger the terminal to transmit the uplink control information to the base station.

According to the method for transmitting uplink control information provided by the disclosure, further comprises: enabling an uplink control information feedback function; and the transmitting the uplink control information to the base station comprises: transmitting the uplink control information to the base station after the uplink control information feedback function is enabled.

According to the method for transmitting uplink control information provided by the present disclosure, wherein the enabling the uplink control information feedback function comprises: enabling the uplink control information feedback function in response to the received second signalling.

According to the method for transmitting uplink control information provided by the present disclosure, wherein the enabling the uplink control information feedback function comprises: the terminal being activated or configured to transmit the uplink control information to the base station.

According to the method for transmitting uplink control information provided by the present disclosure, wherein the second signalling includes at least one of the following: a parameter for indicating that the terminal is activated to transmit the uplink control information to the base station or deactivated to not transmit the uplink control information to the base station; content configuration of the uplink control information; length configuration of a time window for statistically generating the uplink control information; type configuration of uplink control information feedback; periodicity configuration of the uplink control information feedback; or physical resource configuration for feeding back the uplink control information.

According to the method for transmitting uplink control information provided by the present disclosure, wherein the enabling the uplink control information feedback function comprises: enabling the uplink control information feedback function by default when hybrid automatic repeat request HARQ feedback functions of all downlink HARQ processes are disabled.

According to the method for transmitting uplink control information provided by the present disclosure, wherein the enabling the uplink control information feedback function by default comprises: the terminal being activated to transmit the uplink control information to the base station.

According to the method for transmitting uplink control information provided by the present disclosure, the method further comprises: in response to the received third signalling, disabling the uplink control information feedback function.

According to the method for transmitting uplink control information provided by the present disclosure, the method further comprises: disabling a downlink hybrid automatic repeat request HARQ feedback function; and the transmitting the uplink control information to the base station comprises: transmitting the uplink control information to the base station when the downlink HARQ feedback function is disabled.

According to the method for transmitting uplink control information provided by the present disclosure, wherein the disabling the downlink HARQ feedback function comprises: receiving signalling for configuring to disable the downlink HARQ feedback function; and disabling the downlink HARQ feedback function based on the signalling for configuring to disable the downlink HARQ feedback function.

According to the method for transmitting uplink control information provided by the present disclosure, further comprises: receiving signalling for configuring to enable a downlink hybrid automatic repeat request HARQ feedback function; and enabling the downlink HARQ feedback function based on the signalling for configuring to enable the downlink HARQ feedback function.

According to the method for transmitting uplink control information provided by the present disclosure, wherein the feedback function of the downlink HARQ process corresponding to a first parameter is disabled or enabled based on the first parameter.

According to the method for transmitting uplink control information provided by the present disclosure, wherein the first parameter includes at least one of the following: HARQ process numbers, a data service type or quality of service QoS, a downlink control information DCI transmission format used for downlink transmission, a radio network temporary identifier RNTI type used for the downlink transmission, a physical downlink control channel PDCCH search space used for the downlink transmission, or a scheduling type used for the downlink transmission.

According to the method for transmitting uplink control information provided by the present disclosure, when the downlink HARQ feedback function is disabled, an indicator for indicating first information related to the downlink HARQ feedback function included in the downlink control information DCI is removed or used for indicating second information different from the first information.

According to the method for transmitting uplink control information provided by the present disclosure, wherein when the indicator for indicating the first information related to the downlink HARQ feedback function included in the downlink control information DCI is used for indicating the second information different from the first information, the second information includes at least one of the following: related parameters of slot aggregation transmission of physical downlink shared channel PDSCH scheduled by a current DCI, a modulation and coding scheme MCS table used by the PDSCH transmission scheduled by the current DCI, a channel quality indication CQI table used by the terminal for channel state information CSI reporting this time, and enabling or disabling of a current HARQ feedback event.

According to the method for transmitting uplink control information provided by the present disclosure, wherein the decoding statistical information for the downlink transmission includes at least one of the following: a decoding success ratio, a decoding failure ratio, cumulative times of decoding successes, or cumulative times of decoding failures of the downlink transmission.

According to the method for transmitting uplink control information provided by the present disclosure, wherein the decoding statistical information for the downlink transmission is related to a second parameter.

According to the method for transmitting uplink control information provided by the present disclosure, wherein the second parameter includes at least one of: a service type or quality of service QoS of downlink scheduled data or an analog beam direction of the downlink transmission.

According to the method for transmitting uplink control information provided by the present disclosure, wherein the suggestion information for the downlink scheduling includes at least one of the following: a Modulation and Coding Scheme (MCS) value of PDSCH, a minimum MCS value, a maximum MCS value, a MCS offset, a MCS table, times of physical downlink shared channel PDSCH retransmissions, minimum times of the PDSCH retransmissions, maximum times of the PDSCH retransmissions, a number of PDSCH aggregation slots, a minimum number of the PDSCH aggregation slots, a maximum number of the PDSCH aggregation slots, times of PDSCH repeated transmissions, a minimum times of PDSCH repeated transmissions, a maximum times of PDSCH repeated transmissions, enabling or disabling of a downlink HARQ feedback function, a number of HARQ processes with the downlink HARQ feedback function enabled or disabled, which are suggested by the terminal for the base station.

According to the method for transmitting uplink control information provided by the present disclosure, wherein the channel quality related information includes at least one of the following: long-term channel quality indication CQI, a CQI offset, or a CQI table suggested by the terminal.

According to the method for transmitting uplink control information provided by the present disclosure, wherein the transmitting the uplink control information to the base station comprises at least one of the following: transmitting the uplink control information to the base station through physical layer signalling; transmitting the uplink control information to the base station through media access control element MAC CE signalling; or transmit the uplink control information to the base station through radio resource control RRC messages.

According to the method for transmitting uplink control information provided by the present disclosure, wherein the transmitting the uplink control information to the base station through physical layer signalling comprises at least one of: transmitting the uplink control information to the base station through a physical uplink control channel PUCCH; or transmit the uplink control information to the base station through a piggyback of a physical uplink shared channel PUSCH.

According to one aspect of the present disclosure, there is provided a method for receiving uplink control information of a base station, which comprises: receiving uplink control information transmitted by a terminal, wherein the uplink control information comprises at least one of: decoding statistical information for downlink transmission, suggestion information for downlink scheduling, or channel quality related information.

According to the method for receiving uplink control information of the present disclosure, the method further comprises: transmitting first signalling to the terminal, wherein the first signalling is used for triggering the terminal to transmit the uplink control information to the base station by the base station.

According to the method for receiving uplink control information of the present disclosure, the method further comprises: transmitting second signalling to the terminal, wherein the second signalling is used for instructing the terminal to enable the uplink control information feedback function in response to the second signalling.

According to the method for receiving uplink control information of the present disclosure, wherein, the second signalling comprises at least one of the following: a parameter for indicating that the terminal is activated to transmit the uplink control information to the base station or deactivated to not transmit the uplink control information to the base station; content configuration of the uplink control information; length configuration of a time window for statistically generating the uplink control information; type configuration of uplink control information feedback; periodicity configuration of the uplink control information feedback; or physical resource configuration for feeding back the uplink control information.

According to the method for receiving uplink control information of the present disclosure, the method further comprises transmitting third signalling to the terminal, wherein the third signalling is used for instructing the terminal to disable the uplink control information feedback function in response to the third signalling.

According to the method for receiving uplink control information of the present disclosure, the method further comprises: transmitting signalling for configuring to disable or enable a downlink hybrid automatic repeat request HARQ feedback function to the terminal.

According to the method for receiving uplink control information of the present disclosure, the method further comprises: configuring to disable or enable the feedback function of the downlink HARQ process corresponding to a first parameter based on the first parameter.

According to the method for receiving uplink control information of the present disclosure, wherein the first parameter includes at least one of the following: HARQ process numbers, a data service type or quality of service QoS, a downlink control information DCI transmission format used for downlink transmission, a radio network temporary identifier RNTI type used for the downlink transmission, a physical downlink control channel PDCCH search space used for the downlink transmission, or a scheduling type used for the downlink transmission.

According to the method for receiving uplink control information of the present disclosure, the method further comprise: when the downlink HARQ feedback function is disabled, an indicator for indicating first information related to the downlink HARQ feedback function included in the downlink control information DCI is removed or used for indicating second information different from the first information.

According to the method for receiving uplink control information of the present disclosure, wherein when the indicator for indicating the first information related to the downlink HARQ feedback function included in the downlink control information DCI is used for indicating the second information different from the first information, the second information includes at least one of the following: related parameters of slot aggregation transmission of physical downlink shared channel PDSCH scheduled by a current DCI, a modulation and coding scheme MCS table used by the PDSCH transmission scheduled by the current DCI, a channel quality indication CQI table used by the terminal for channel state information CSI reporting this time, and enabling or disabling of a current HARQ feedback event.

According to the method for receiving uplink control information of the present disclosure, wherein the decoding statistical information for the downlink transmission includes at least one of the following: a decoding success ratio, a decoding failure ratio, cumulative times of decoding successes, or cumulative times of decoding failures of the downlink transmission.

According to the method for receiving uplink control information of the present disclosure, the decoding statistical information for the downlink transmission is related to a second parameter.

According to the method for receiving uplink control information of the present disclosure, wherein the second parameter includes at least one of: a service type or quality of service QoS of downlink scheduled data or an analog beam direction of the downlink transmission.

According to the method for receiving uplink control information of the present disclosure, wherein the suggestion information for the downlink scheduling includes at least one of the following: a Modulation and Coding Scheme (MCS) value of PDSCH, a minimum MCS value, a maximum MCS value, a MCS offset, a MCS table, times of physical downlink shared channel PDSCH retransmissions, minimum times of the PDSCH retransmissions, maximum times of the PDSCH retransmissions, a number of PDSCH aggregation slots, a minimum number of the PDSCH aggregation slots, a maximum number of the PDSCH aggregation slots, times of PDSCH repeated transmissions, a minimum times of PDSCH repeated transmissions, a maximum times of PDSCH repeated transmissions, enabling or disabling of a downlink HARQ feedback function, a number of HARQ processes with the downlink HARQ feedback function enabled or disabled, which are suggested by the terminal for the base station.

According to the method for receiving uplink control information of the present disclosure, wherein the channel quality related information includes at least one of the following: long-term channel quality indication CQI, a CQI offset, or a CQI table suggested by the terminal.

According to the method for receiving uplink control information of the present disclosure, wherein the receiving uplink control information transmitted by the terminal comprises at least one of the following: receiving the uplink control information transmitted by the terminal through physical layer signalling; receiving the uplink control information transmitted by the terminal through media access control control element MAC CE signalling; or receiving the uplink control information transmitted by the terminal through radio resource control RRC signalling.

According to the method for receiving uplink control information of the present disclosure, wherein the receiving the uplink control information transmitted by the terminal through physical layer signalling comprises at least one of: receiving the uplink control information transmitted by the terminal through a physical uplink control channel PUCCH; or receiving the uplink control information transmitted by the terminal through a piggyback of a physical uplink shared channel PUSCH.

According to one aspect of the present disclosure, there is provided a method for configuring a downlink hybrid automatic repeat request HARQ feedback function, comprising: configuring to disable or enable the feedback function of a HARQ process corresponding to a first parameter based on the first parameter.

According to the method for configuring HARQ feedback function of the present disclosure, wherein the first parameter includes at least one of the following: HARQ process numbers, a data service type or quality of service QoS, a downlink control information DCI transmission format used for downlink transmission, a radio network temporary identifier RNTI type used for the downlink transmission, a physical downlink control channel PDCCH search space used for the downlink transmission, or a scheduling type used for the downlink transmission.

According to the method for configuring HARQ feedback function of the present disclosure, the method further comprises: when the downlink HARQ feedback function is disabled, an indicator for indicating first information related to the downlink HARQ feedback function included in the DCI is configured to be removed or used for indicating second information different from the first information.

According to the method for configuring HARQ feedback function of the present disclosure, wherein when the indicator for indicating the first information related to the downlink HARQ feedback function included in the downlink control information DCI is used for indicating the second information different from the first information, the second information includes at least one of the following: related parameters of slot aggregation transmission of physical downlink shared channel PDSCH scheduled by a current DCI, a modulation and coding scheme MCS table used by the PDSCH transmission scheduled by the current DCI, a channel quality indication CQI table used by the terminal for channel state information CSI reporting this time, and enabling or disabling of a current HARQ feedback event.

According to the method for configuring HARQ feedback function of the present disclosure, the method further comprises: transmitting signalling for configuring to disable or enable the downlink hybrid automatic repeat request HARQ feedback function to the terminal.

According to an aspect of the present disclosure, there is provided a user equipment, comprising: a transceiver configured to transmit and receive signals with the outside; and a processor configured to control the transceiver to perform the above described method for transmitting uplink control information.

According to an aspect of the present disclosure, there is provided a base station, comprising: a transceiver configured to transmit and receive signals with the outside; and a processor configured to control the transceiver to perform the above described method for receiving uplink control information and the method for configuring downlink HARQ feedback function.

The above description is only the specific implementation of this disclosure, but the protection scope of this disclosure is not limited to this. Any person familiar with this technical field can make various changes or substitutions within the technical scope disclosed in this disclosure, and these changes or substitutions should be covered within the protection scope of this disclosure. Therefore, the protection scope of this disclosure shall be subject to the protection scope of the claims.

The invention claimed is:

1. A method of a terminal for transmitting uplink control information, the method comprising:

receiving, from a base station via radio resource control (RRC) signaling, configuration information on a length of a time window for statistically generating the uplink control information;

based on the configuration information on the length of the time window, accumulating a number of downlink transmissions received within the time window, wherein a plurality of downlink transmissions corresponding to a same transport block (TB) are counted as one downlink transmission;

in response to determining that the accumulated number of the downlink transmissions reaches a preconfigured threshold ($N_{total}$) generating decoding statistical information for the downlink transmission, wherein the decoding statistical information is generated every time the accumulated number of the downlink transmissions reaches the Ntotal, and wherein the decoding statistical information for the downlink transmission includes at least one of: a decoding success ratio, a decoding failure ratio, cumulative times of decoding successes, or cumulative times of decoding failures of the downlink transmission within the time window; and based on that a downlink hybrid automatic repeat and request (HARQ) feedback function is disabled, transmitting, to the base station, the uplink control information including the decoding statistical information for the downlink transmissions.

2. The method of claim 1, wherein transmitting the uplink control information to the base station comprises at least one of:

periodically transmitting the uplink control information to the base station;

transmitting, to the base station, the uplink control information based on that a predefined or preconfigured condition is met; or transmitting, to the base station, the uplink control information in response to receiving a first signal from the base station, via a medium access control control element (MAC CE) signaling or a downlink control information (DCI) signaling, wherein the first signal is used to trigger the terminal to transmit the uplink control information to the base station.

3. The method of claim 1, further comprising:

in response to receiving a second signal from the base station via the RRC signaling, transmitting the uplink control information to the base station, wherein the second signal comprises at least one of:

a parameter for indicating that the terminal is activated to transmit, the base station, the uplink control information or deactivated to not transmit, to the base station, the uplink control information;

a content configuration of the uplink control information;

a type configuration of uplink control information feedback;

a periodicity configuration of the uplink control information feedback; or a physical resource configuration for feeding back the uplink control information.

4. The method of claim 1, further comprising:

based on that the downlink HARQ feedback function is disabled for all HARQ processes, transmitting the uplink control information to the base station by default.

5. The method of claim 1, further comprising:

receiving signaling for configuring to disable the downlink HARQ feedback function; and disabling the downlink HARQ feedback function based on the signaling for configuring to disable the downlink HARQ feedback function.

6. The method of claim 5, wherein disabling the downlink HARQ feedback function comprises:

disabling a feedback function of a downlink HARQ process corresponding to a first parameter based on the first parameter, and wherein the first parameter comprises at least one of: HARQ process numbers, a data service type or quality of service (QoS), a downlink control information (DCI) transmission format used for the downlink transmission, a radio network temporary identifier (RNTI) type used for the downlink transmission, a physical downlink control channel (PDCCH) search space used for the downlink transmission, or a scheduling type used for the downlink transmission.

7. The method of claim 5, wherein, based on that the downlink HARQ feedback function is disabled, an indicator for indicating first information related to the downlink HARQ feedback function included in downlink control information (DCI) is removed or the indicator is used for indicating second information different from the first information, and wherein, based on that the indicator for indicating the first information related to the downlink HARQ feedback function included in the DCI is used for indicating the second information different from the first information, the second information comprises at least one of related parameters of slot aggregation transmission of physical downlink shared channel (PDSCH) scheduled by a current DCI, a modulation and coding scheme (MCS) table used by the PDSCH transmission scheduled by the current DCI, a channel quality indication (CQI) table used by the terminal for channel state information (CSI) reporting this time, or enabling or disabling a current HARQ feedback event.

8. The method of claim 1, wherein the decoding statistical information for the downlink transmission is related to a second parameter, and wherein the second parameter comprises at least one of a service type, quality of service (QoS) of downlink scheduled data, or an analog beam direction of the downlink transmission.

9. The method of claim 1, wherein the uplink control information further includes suggestion information for downlink scheduling, and wherein the suggestion information for the downlink scheduling comprises at least one of: a modulation and coding scheme (MCS) value of physical downlink shared channel (PDSCH), a minimum MCS value, a maximum MCS value, an MCS offset, an MCS table, times of PDSCH retransmissions, minimum times of the PDSCH retransmissions, maximum times of the PDSCH retransmissions, a number of PDSCH aggregation slots, a minimum number of the PDSCH aggregation slots, a maximum number of the PDSCH aggregation slots, times of PDSCH repeated transmissions, a minimum times of PDSCH repeated transmissions, a maximum times of PDSCH repeated transmissions, enabling or disabling of a downlink HARQ feedback function, or a number of HARQ processes with the downlink HARQ feedback function enabled or disabled.

10. The method of claim 1, wherein the uplink control information further includes channel quality related information, and wherein the channel quality related information comprises at least one of a long-term channel quality indication (CQI), a CQI offset, or a CQI table suggested by the terminal.

11. The method of claim 1, wherein transmitting, to the base station, the uplink control information comprises at least one of:

transmitting the uplink control information to the base station via a physical uplink control channel (PUCCH);

transmitting the uplink control information to the base station via a piggyback of a physical uplink shared channel (PUSCH);

transmitting the uplink control information to the base station via a media access control control element (MAC CE) signal; or transmitting the uplink control information to the base station via a radio resource control (RRC) message.

12. A method of a base station for receiving uplink control information, the method comprising:

transmitting, to a terminal via radio resource control (RRC) signaling, configuration information on a length of a time window for statistically generating the uplink control information, wherein based on the configuration information on the length of the time window, a number of downlink transmissions received by the terminal within the time window is accumulated and wherein a plurality of downlink transmissions corresponding to a same transport block (TB) are counted as one downlink transmission, and wherein, in response to determining that the accumulated number of the downlink transmission reaches a threshold ($N_{total}$) decoding statistical information for the downlink transmission is generated, wherein the decoding statistical information is generated every time the accumulated number of the downlink transmissions reaches the Ntotal, and wherein the decoding statistical information for the downlink transmission includes at least one of: a decoding success ratio, a decoding failure ratio, cumulative times of decoding successes, or cumulative times of decoding failures of the downlink transmission within the time window; and based on that a downlink hybrid automatic repeat and request (HARQ) feedback function is disabled, receiving, from the terminal, the uplink control information including the decoding statistical information for the downlink transmission.

13. The method of claim 12, wherein the decoding statistical information for the downlink transmission comprises at least one of: a decoding success ratio, a decoding failure ratio, cumulative times of decoding successes, or cumulative times of decoding failures of the downlink transmission, wherein the uplink control information further includes at least one of suggestion information for downlink scheduling or channel quality related information, wherein the suggestion information for the downlink scheduling comprises at least one of: a modulation and coding scheme (MCS) value of physical downlink shared channel (PDSCH), a minimum MCS value, a maximum MCS value, an MCS offset, an MCS table, times of PDSCH retransmissions, minimum times of the PDSCH retransmissions, maximum times of the PDSCH retransmissions, a number of PDSCH aggregation slots, a minimum number of the PDSCH aggregation slots, a maximum number of the PDSCH aggregation slots, times of PDSCH repeated transmissions, a minimum times of PDSCH repeated transmissions, a maximum times of PDSCH repeated transmissions, enabling or disabling of a downlink HARQ feedback function, or a number of HARQ processes with the downlink HARQ feedback function enabled or disabled, and wherein the channel quality related information comprises at least one of a long-term channel quality indication (CQI), a CQI offset, or a CQI table suggested by the terminal.

14. A terminal for transmitting uplink control information, the terminal comprising:

at least one transceiver; and at least one processor operably coupled to the transceiver, at least one memory, communicatively coupled to the at least one processor, storing instructions executable by the at least one processor to cause the terminal to:

receive, from a base station, via radio resource control (RRC) signaling, configuration information on a length of a time window for statistically generating the uplink control information;

based on the configuration information on the length of the time window, accumulating a number of downlink transmissions received within the time window, wherein a plurality of downlink transmissions corresponding to a same transport block (TB) are counted as one downlink transmission;

in response to determining that the accumulated number of downlink transmissions reaches a threshold ($N_{total}$) generate decoding statistical information for the downlink transmissions, wherein the decoding statistical information is generated every time the accumulated number of the downlink transmissions reaches the Ntotal, and wherein the decoding statistical information for the downlink transmission includes at least one of: a decoding success ratio, a decoding failure ratio, cumulative times of decoding successes, or cumulative times of decoding failures of the downlink transmission within the time window; and based on that a downlink hybrid automatic repeat and request (HARQ) feedback function is disabled, transmit, to the base station, the uplink control information including the decoding statistical information for the downlink transmissions.

15. The terminal of claim 14, wherein the instructions executable by the at least one processor further to cause the terminal to:

periodically transmit the uplink control information to the base station;

transmit, to the base station, the uplink control information based on that a predefined or preconfigured condition is met; or transmit, to the base station, the uplink control information in response to receiving a first signal from the base station, via a medium access control control element (MAC CE) signaling or a downlink control information (DCI) signaling, wherein the first signal is used to trigger the terminal to transmit the uplink control information to the base station.

16. The terminal of claim 14, wherein the instructions executable by the at least one processor further to cause the terminal to:

in response to receiving a second signal from the base station, via the RRC signaling, transmit the uplink control information to the base station, wherein the second signal comprises at least one of:

a parameter for indicating that the terminal is activated to transmit, the base station, the uplink control information or deactivated to not transmit, to the base station, the uplink control information;

a content configuration of the uplink control information;

a type configuration of uplink control information feedback;

a periodicity configuration of the uplink control information feedback; or a physical resource configuration for feeding back the uplink control information.

17. The terminal of claim 14, wherein the instructions executable by the at least one processor further to cause the terminal to:

based on that the downlink HARQ feedback function is disabled for all HARQ processes, transmit the uplink control information to the base station by default.

18. The terminal of claim 14, wherein the instructions executable by the at least one processor further to cause the terminal to:

receive signaling for configuring to disable the downlink HARQ feedback function; and disable the downlink HARQ feedback function based on the signaling for configuring to disable the downlink HARQ feedback function.

19. The terminal of claim 18, wherein the instructions executable by the at least one processor further to cause the terminal to:

disable a feedback function of a downlink HARQ process corresponding to a first parameter based on the first parameter, and wherein the first parameter comprises at least one of HARQ process numbers, a data service type or quality of service (QoS), a downlink control information (DCI) transmission format used for the downlink transmission, a radio network temporary identifier (RNTI) type used for the downlink transmission, a physical downlink control channel (PDCCH) search space used for the downlink transmission, or a scheduling type used for the downlink transmission.

* * * * *